(12) United States Patent
Bradley et al.

(10) Patent No.: US 6,445,334 B1
(45) Date of Patent: Sep. 3, 2002

(54) GROUND PENETRATING RADAR SYSTEM

(75) Inventors: Marshall R. Bradley, Slidell, LA (US); Robert J. McCummins, Jr., Long Beach; Michael P. Crowe, Gulfport, both of MI (US); Michael E. Duncan, Slidell, LA (US)

(73) Assignee: Planning Systems Incorporated, Reston, VA (US)

( * ) Notice: Subject to any disclaimer, the term of this patent is extended or adjusted under 35 U.S.C. 154(b) by 0 days.

(21) Appl. No.: 09/752,085

(22) Filed: Dec. 29, 2000

(51) Int. Cl.[7] .......................... G01S 13/88; G01S 13/04
(52) U.S. Cl. .............................. 342/22; 342/27; 342/195
(58) Field of Search ............................ 342/21, 22, 27, 342/28, 61, 70, 71, 72, 118, 175, 195, 25

(56) References Cited

U.S. PATENT DOCUMENTS

| | | | |
|---|---|---|---|
| 2,517,951 A | * 8/1950 | Wheeler | 342/22 X |
| 4,218,678 A | 8/1980 | Fowler et al. | |
| 5,227,799 A | * 7/1993 | Kimura et al. | 342/22 |
| 5,248,975 A | * 9/1993 | Schutz | 342/21 |
| 5,325,095 A | 6/1994 | Vadnais et al. | 342/22 |
| 5,499,029 A | 3/1996 | Bashforth et al. | 342/22 |
| 5,557,277 A | * 9/1996 | Tricoles et al. | 342/22 |
| 5,647,439 A | * 7/1997 | Burdick et al. | 342/22 X |
| 5,659,985 A | * 8/1997 | Stump | 342/22 X |
| 5,704,142 A | * 1/1998 | Stump | 342/22 X |
| 5,835,054 A | * 11/1998 | Warhus et al. | 342/22 |
| 5,900,833 A | * 5/1999 | Sunlin et al. | 342/22 |
| 5,904,210 A | * 5/1999 | Stump et al. | 342/22 X |
| 6,002,357 A | * 12/1999 | Redfern et al. | 342/22 |
| 6,119,376 A | * 9/2000 | Stump | 342/22 X |
| 6,195,922 B1 | * 3/2001 | Stump | 342/22 X |

OTHER PUBLICATIONS

Dubey, A.C. et al., "Mine Detection With a Multi–Channel Stepped–Frequency Ground Penetrating Radar," Proceedings of SPIE, vol. 3710, Part Two, Apr. 5–9, 1999, pp. 953–960.

* cited by examiner

Primary Examiner—Bernarr E. Gregory
(74) Attorney, Agent, or Firm—Baker Botts L.L.P.

(57) ABSTRACT

A ground penetrating radar system includes a cart configured to be movable along the ground. A computer is mechanically coupled to the cart. A radar electronics module is mechanically coupled to the cart and electrically coupled to the computer. A first antenna array is mechanically coupled to the cart, electrically coupled to the radar electronics module, and oriented to radiate into the ground and receive radiation from the ground. A second antenna array is mechanically coupled to the cart, electrically coupled to the radar electronics module, and oriented to radiate into the ground and receive radiation from the ground. A movement detector, which is configured to detect movement of the cart, is coupled to the computer. The computer is configured to trigger the radar electronics module when the computer detects that the cart has moved a predefined distance. The system uses nearfield beam forming, which is accomplished through fully coherent signal processing and synthetic aperture reception and processing, to image buried objects in three dimensions. The system displays a plan, or top, view and a side view of the area being scanned to provide a three dimensional perspective on a two dimensional computer screen.

36 Claims, 29 Drawing Sheets

Side View $(x_m, y_n, z)$

Top View $2N_s+1$ $2M_s+1$ m channels $(x_m, y_n)$ n rows

GROUND PENETRATING RADAR SYSTEM

The invention was made with Government Support under Federal Contract Numbers DAAB07-98-C-G014 and DAAB15-00-C-1009 awarded by the United States Army. The Government has certain rights in the invention.

FIELD OF THE INVENTION

In general, the invention relates to the field of radar systems. More particularly, the invention relates to the field of ground penetrating radar systems.

BACKGROUND OF THE INVENTION

There are numerous applications in which it is useful to view images of underground objects or objects embedded in the ground or in a material such as concrete, that would not otherwise be visible. For example, it is helpful to utility workers to see images of pipes, cables and conduits that are underground where they are about to dig a hole or a trench. It would be even more helpful if the workers could see a three-dimensional image, so that if an imaged object is deep in the ground below the depth they intend to work, they need not be concerned with the object.

Similarly, a system that would allow workers to see images in three dimensions beneath the surface of the ground would be useful in the field of mine detection. This field has become increasingly important as populations have been moving back into previously war-torn areas of the earth. Frequently, when a war ends, civilians move back into a mined area before the authorities can mount a demining operation. Many civilians are injured or killed by such mines even after a war is over. During a war, demining operations help clear a mine field before foot soldiers or vehicles cross it.

In such demining operations, it is useful to know accurately not only the surface coordinates of a buried mine, but also the depth at which the mine is buried. It is also important that the equipment used for demining is mobile and that it is capable of exploring a large amount of territory in a short period of time, while maintaining an accurate and detailed record of the objects detected. Such information allows personnel to make intelligent decisions regarding the methods and equipment that are necessary to remove the detected mines.

SUMMARY OF THE INVENTION

The invention is a ground penetrating radar system mounted on a cart to achieve the desired mobility. The system uses two offset banks of interleaved transmit and receive antennas to achieve the desired accuracy. The receive and transmit antennas are properly oriented with respect to each other to reduce cross coupling and maximize desired subsurface echoes. The system uses nearfield beam forming, which is accomplished through fully coherent signal processing and synthetic aperture reception and processing, to image buried objects in three dimensions. The system displays a plan, or top, view and a side view of the area being scanned to provide a three dimensional perspective on a two dimensional computer screen.

In general, in one aspect, the invention features a ground penetrating radar system which includes a cart configured to be movable along the ground. A computer is mechanically coupled to the cart. A radar electronics module is mechanically coupled to the cart and electrically coupled to the computer. A first antenna array is mechanically coupled to the cart, electrically coupled to the radar electronics module, and oriented to radiate into the ground and receive radiation from the ground. A second antenna array is mechanically coupled to the cart, electrically coupled to the radar electronics module, and oriented to radiate into the ground and receive radiation from the ground. A movement detector, which is configured to detect movement of the cart, is coupled to the computer. The computer is configured to trigger the radar electronics module when the computer detects that the cart has moved a predefined distance.

Implementations of the invention may include one or more of the following. The radar electronics module may include a first radar electronics module electrically coupled to the first antenna array and a second radar electronics module electrically coupled to the second antenna array. The first antenna array may be configured to radiate and receive radiation from a first series of points along a first set of curves parallel to the direction of movement of the cart. The second antenna array may be configured to radiate and receive radiation from a second series of points along a second set of curves parallel to the direction of movement of the cart. The first set of curves may be interleaved with the second set of curves.

In general, in another aspect, the invention features a ground penetrating radar system including a first bank of receive antennas arranged along a first axis, a first bank of transmit antennas arranged along a second axis substantially parallel to the first axis and horizontally displaced from the first axis, a second bank of receive antennas arranged along a third axis substantially parallel to the first axis and horizontally displaced from the first axis, and a second bank of transmit antennas arranged along a fourth axis substantially parallel to the first axis and horizontally displaced from the first axis. A first radar electronics module is coupled to the first bank of transmit antennas and the first bank of receive antennas. A second radar electronics module is coupled to the second bank of transmit antennas and the second bank of receive antennas. The transmit antennas in the first bank of transmit antennas are interleaved with the receive antennas in the first bank of receive antennas and the transmit antennas in the second bank of transmit antennas are interleaved with the receive antennas in the second bank of receive antennas. The receive antennas in the first bank of transmit antennas are offset along the first axis from the receive antennas in the second bank of transmit antennas.

Implementations of the invention may include one or more of the following. The first bank of transmit antennas may be offset along the second axis with respect to the second bank of transmit antennas. The banks of receive antennas may alternate with the banks of transmit antennas. Each transmit antenna may be adjacent to at least one receive antenna. Each transmit antenna may be oriented to minimize electromagnetic coupling to at least one of its adjacent receive antennas. Each transmit antenna may include at least one spiral arm of conductive material. Each receive antenna may include at least one spiral arm of conductive material. A tangent to the inside of the spiral arm at the edge of a transmit antenna may be substantially perpendicular to a tangent to the inside of the spiral arm at the edge of a receive antenna adjacent to the transmit antenna. Each transmit antenna may include two spiral arms of conductive material. Each receive antenna may include two spiral arms of conductive material.

The transmit antennas and the receive antennas may have faces with centers. Two adjacent first bank receive antennas from the first bank of receive antennas and a first bank transmit antenna from the first bank of transmit antennas interleaved between the two adjacent first bank receive antennas may be positioned such that lines between the centers of the faces of the two adjacent first bank receive antennas and the interleaved first bank transmit antenna form a first triangle having sides of approximately the same length. Two adjacent second bank receive antennas from the second bank of receive antennas and a second bank transmit antenna from the second bank of transmit antennas interleaved between the two adjacent second bank receive antennas may be positioned such that lines between the centers of the faces of the two adjacent second bank receive antennas and the interleaved second bank transmit antenna form a second triangle having sides of approximately the same length. A vertex of the first triangle may be displaced in the direction of the first axis relative to a corresponding vertex of the second triangle by an amount substantially equal to one-half the distance from the center of one side of the first triangle to the center of another side of the first triangle.

The third axis may be horizontally displaced from the first axis by an amount substantially equal to eight times the distance from the center of one side of the first triangle to the center of another side of the first triangle. The transmit antennas may not be required to be in contact with the ground when in operation. The receive antennas may not be required to be in contact with the ground when in operation.

In general, in another aspect, the invention features a ground penetrating radar system including a digital module. The digital module includes a direct digital synthesizer configured to generate a digital IF reference signal. A digital to analog converter is coupled to the direct digital synthesizer and is configured to convert the digital IF reference signal to an analog IF transmit signal. An analog to digital converter is configured to convert an analog IF receive signal to a digital IF receive signal. A digital down converter is configured to digitally mix the digital IF receive signal with the digital IF reference signal to produce an in-phase product and the digital IF reference signal shifted in phase by ninety degrees to produce a quadrature product. The ground penetrating radar system includes an RF module coupled to the digital module. The RF module includes an up-converter configured to convert the analog IF transmit signal into a transmit signal and a down-converter configured to convert a receive signal into an analog IF receive signal. The system includes a transmit antenna array coupled to the up-converter for radiating the transmit signal and a receive antenna array coupled to the down-converter for receiving the receive signal.

Implementations of the invention may include one or more of the following. The transmit antenna array may include a plurality of transmit antennas. The receive antenna array may include a plurality of receive antennas. The system may include a digital signal processor. The system may include a transmit switch for applying the transmit signal to one of the plurality of transmit antennas. The transmit switch may be controlled by the digital signal processor. The system may include a receiver switch for receiving the receive signal from one of the plurality of receive antennas. The receiver switch may be controlled by the digital signal processor. The digital signal processor may control the direct digital synthesizer, the digital down converter, the up-converter and the down-converter. The transmit signal may be a stepped-frequency transmit signal. The receive signal may be a stepped-frequency receive signal. The system may include a computer coupled to a processor through an extensible network. The processor may be configured to communicate with the digital signal processor. The extensible network may be a local area network, e.g., ETHERNET network.

In general, in another aspect, the invention features a ground penetrating radar system including a digital module configured to generate an analog IF transmit signal and to receive an analog IF receive signal. The system includes an RF module, which includes a triple-heterodyne up-converter for converting an analog IF transmit signal into a stepped-frequency transmit signal. The RF module also includes a triple-heterodyne frequency converter for converting a stepped-frequency receive signal into an analog IF receive signal. The system includes a transmit antenna coupled to the up-converter for radiating the stepped-frequency transmit signal and a receive antenna coupled to the down-converter for receiving the stepped-frequency receive signal.

Implementations of the invention may include one or more of the following. The triple-heterodyne up-converter may include a first up-converter configured to mix the analog IF transmit signal with a signal from a first local oscillator to produce a first intermediate signal and an aliased first intermediate signal. The triple-heterodyne up-converter may include a first filter coupled to the first up-converter for substantially rejecting the aliased first intermediate signal. The triple-heterodyne up-converter may include a second up-converter coupled to the first filter configured to mix the first intermediate signal with a signal from a second local oscillator to produce a second intermediate signal and an aliased second intermediate signal. The triple-heterodyne up-converter may include a second filter coupled to the second up-converter for substantially rejecting the aliased second intermediate signal. The triple-heterodyne up-converter may include a down-converter coupled to the second filter configured to mix the second intermediate signal with a stepped frequency signal to produce the stepped-frequency transmit signal and an aliased stepped-frequency transmit signal. The stepped-frequency transmit signal may have substantially no frequency components in the pass bands of the first filter or the second filter. The triple-heterodyne up-converter may include a third filter coupled to the down-converter for substantially rejecting the aliased stepped-frequency transmit signal.

The triple-heterodyne up converter may include an up-converter configured to mix the stepped-frequency receive signal with a stepped-frequency signal to produce a first intermediate signal and an aliased first intermediate signal. The triple-heterodyne up-converter may include a first filter coupled to the first up-converter for substantially rejecting the aliased first intermediate signal. The triple-heterodyne up-converter may include a first down-converter coupled to the first filter configured to mix the first intermediate signal with a signal from a first local oscillator to produce a second intermediate signal and an aliased second intermediate signal. The triple-heterodyne up-converter may include a second filter coupled to the first down-converter for substantially rejecting the aliased second intermediate signal. The triple-heterodyne up-converter may include a second down-converter coupled to the second filter configured to mix the second intermediate signal with a second local oscillator to produce the analog IF receive signal and an aliased analog IF receive signal. The triple-heterodyne up-converter may include a third filter coupled to the second down-converter for substantially rejecting the aliased analog IF receive signal.

In general, in another aspect, the invention features a ground penetrating radar system including a transmitter, a receiver, an array of transmit antennas, an array of receive antennas interleaved with the array of transmit antennas, a transmit switch configured to selectively couple the transmitter to one of the array of transmit antennas and a receive switch configured to selectively couple the receiver to one of the array of receive antennas. The array of transmit antennas is arranged in one or more rows. The array of receive antennas is arranged in one or more rows. Each row is parallel to, adjacent to and offset from one of the rows of transmit antennas, so that each receive antenna in a row except one is adjacent to two transmit antennas, and each transmit antenna in a row except one is adjacent to two receive antennas. The transmit switch and the receive switch are configured to couple the transmitter and receiver, respectively, to a first transmit antenna and a first adjacent receive antenna, and subsequently to the first transmit antenna and a second adjacent receive antenna.

In general, in another aspect, the invention features a method for collecting and displaying data from a ground penetrating radar system, which includes a plurality of transmit antennas and a plurality of receive antennas. Each transmit antenna, except one, has two adjacent receive antennas. The system is mounted on a movable cart. The method includes collecting raw data. Collecting raw data includes (a) selecting a first of the plurality of transmit antennas. Collecting raw data further includes (b) selecting a first receive antenna that is adjacent to the selected transmit antenna. Collecting raw data further includes (c) collecting data using the selected transmit antenna and the selected receive antenna to produce raw data. The raw data collected at spatial location $(x_m, y_n)$ is denoted by $\Psi_{mnp}$ where the indices m, n are used to denote position in a grid of spatial locations where data has been collected, and p is an index ranging from 1 to P corresponding to the frequency $f_p$ at which the data was collected. Collecting raw data includes (d) repeating step (c) for both receive antennas adjacent to the selected transmit antenna. Collecting raw data further includes (e) repeating steps b, c and d for all transmit antennas. Collecting raw data further includes repeating steps a, b, c, d, and e each time the cart moves to a new location. The method further includes preconditioning the raw data to produce preconditioned data, analyzing the preconditioned data, and displaying images of the analyzed data.

Implementations of the invention may include one or more of the following. Preconditioning the raw data to produce preconditioned data may include (g) removing a constant frequency component and a system travel time delay, (h) removing a transmit-antenna to receive-antenna coupling effect, (i) prewhitening, and (j) repeating steps (g), (h) and (i) for each spatial location of the raw data.

Removing a constant frequency component and a system travel time delay may include applying the following equation:

$$\hat{\Psi}_{mnp} = \left(\Psi_{mnp} - \frac{1}{P}\sum_{p=1}^{P}\Psi_{mnp}\right)\exp(i \cdot 2\pi \cdot f_p \cdot \tau).$$

Removing the transmit-antenna to receive-antenna coupling effect may include applying the following equation:

$$\Psi_{mnp} = \hat{\Psi}_{mnp} - \hat{\Psi}_{m\bar{n}p}$$

where $\hat{\Psi}_{m\bar{n}p}$ is an in track reference scan.

Removing the transmit-antenna to receive-antenna coupling effect may include applying the following equation:

$$\Psi_{mnp} = \hat{\Psi}_{mnp} - \frac{1}{N_2 - N_1 + 1} \cdot \sum_{n=N_1}^{N_2}\hat{\Psi}_{mnp}$$

where $N_1$ and $N_2$ define a region to be imaged.

Removing the transmit-antenna to receive-antenna coupling effect may include applying the following equation:

$$\Psi_{mnp} = \sum_{q=-Q}^{Q} a_q \cdot \hat{\Psi}_{m,n+q,p}$$

where $a_q$ are digital filter coefficients chosen to reject low frequency spatial energy.

Removing the transmit-antenna to receive-antenna coupling effect may include applying the following equation:

$$\Psi_{mnp} = \hat{\Psi}_{mnp} - \hat{\Psi}_{\bar{m}np}$$

where $\hat{\Psi}_{\bar{m}np}$ is a cross line reference scan.

Prewhitening may include applying the following equation:

$$\gamma_{mnp} = b_p \cdot \Psi_{mnp}$$

where $b_p$ are frequency dependent weights.

Analyzing the preconditioned data may include applying the following equation:

$$I_{mnp} = \frac{1}{(2U+1)(2V+1)P} \cdot \sum_{u=-U}^{U}\sum_{v=-V}^{V}\sum_{p=P_1}^{P_2} \gamma_{m+u,n+v,p}\exp(i \cdot 2\pi \cdot f_p \cdot \tau_{uvw})$$

where
 $I_{mnw}$ is the complex image value at spatial location $(x_{F,m}, y_{F,n}, z_w)$;
 U is the SAR array size in the cross-track direction;
 V is SAR array size in the along track direction;
 $(f_{P_1}, f_{P_2})$ is the frequency processing band;
 $\tau_{uvw}$ is the travel time from source (u, v) in the SAR array down to a focal point at depth $z_w$ and back up to receiver (u, v) in the SAR array;

$$x_{F,m} = \frac{3d}{4} + \frac{(m-1)d}{4};$$

$y_{F,n} = 0.933013d + (n-1)dy$;
 d=5.52 inches; and
 dy=scan spacing.

The transmit antennas and the receive antennas may be in contact with the ground and the following equation may apply:

$$\tau_{uvw} = \frac{1}{c_g}[(x_{s,u} - x_{r,u})^2 + (y_{s,v} - y_{r,v})^2 + z_w^2]$$

where $(x_{s,u}, y_{s,v})$ and $(x_{r,u}, y_{r,v})$ are the location of the transmit and receive antennas and $c_g$ is the speed of light in the ground.

Displaying images of the analyzed data may include computing a plan view image of the analyzed data, computing a side view image of the analyzed data, and displaying the plan view image and the side view image.

Computing a plan view image of the analyzed data may include applying the following equation:

$$\text{PlanView}_{mn} = \max_w |I_{mnw}|^2$$

where $\max_w$ is the maximum value across all w (depths).

Computing a side view image of the analyzed data may include applying the following equation:

$$\text{SideView}_{nw} = \max_m |I_{mnw}|^2$$

where $\max_w$ is the maximum value across all w (depths).

DESCRIPTION OF THE PREFERRED EMBODIMENTS

Figure 1:
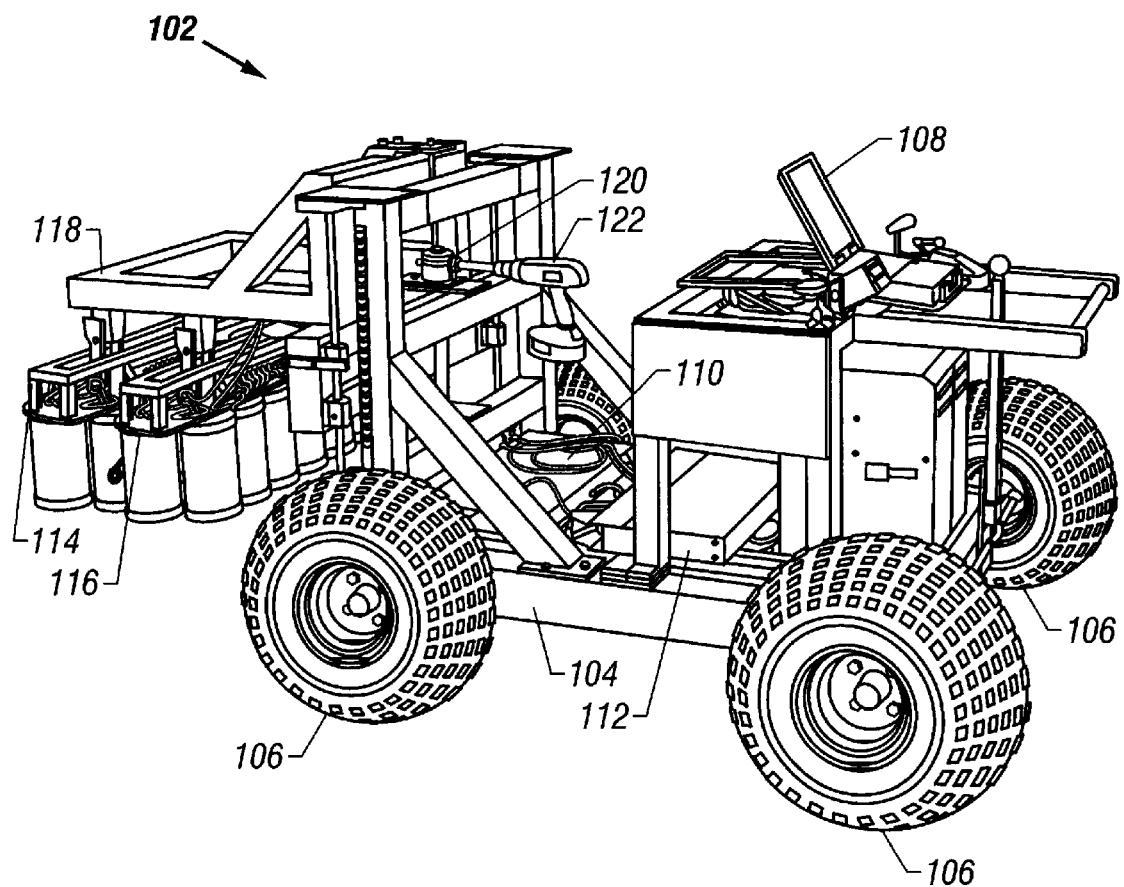
FIG. 1 is a perspective view of a ground penetrating radar system according to the present invention.

In the following detailed description and in the several figures of the drawings, like elements are identified with like reference numerals.

As shown in the drawings for purposes of illustration, the invention is embodied in a novel ground penetrating radar system. A system according to the invention includes interleaved antenna arrays of properly oriented spiral transmit and receive antennas. Switching among the antennas allows samples to be efficiently taken with high spatial density. A digital frequency synthesizer and digital down converter allow fast and accurate measurements. Triple heterodyne up and down conversion reduces the likelihood that mixing products will interfere with the measurements. The system is extensible because of a local area network, e.g., ETHERNET, interconnection between system components. The system uses advanced processing and spatial filtering techniques to improve the quality of the images produced.

A ground penetrating radar system 102, illustrated in FIG. 1, includes a cart 104 that can be moved along the ground. In the preferred embodiment, the cart 104 has four all terrain wheels 106 that give the cart 104 mobility over all types of terrain. Other techniques for providing mobility, such as tracks or skids, are within the scope of the invention.

In an preferred embodiment, the cart 104 is a lightweight, compact design fabricated out of aluminum tubing. Four inch square, thin wall tubing is used for the frame. All joints are welded and the frame is painted with polyurethane paint. Mount points for all major system components are built into the frame with easy access to each mount for individual component removal without tools. In other embodiments, the cart is fabricated out of other metals, such as steel, or other materials, such as light-weight composites.

The system 102 includes a computer 108 mechanically coupled to the cart 104. In the preferred embodiment illustrated in FIG. 1, the computer 108 is a laptop computer, having its own display, memory, long term storage and other peripherals, that rests on or is secured to the cart 104. In other embodiments, the computer is a desktop-type computer.

A radar electronics module 110, 112 is mechanically coupled to the cart 104 and electrically coupled to the computer 108. In a preferred embodiment, the radar electronics module 110, 112 includes two 25 inch wide, 12 inch long, 2.5 inch high black anodized aluminum enclosures 110, 112, each containing two separate compartments for a digital circuit board and an analog (or RF) printed circuit board (both described in detail below). The circuit board compartments are separated by an aluminum plate, which physically and electrically isolates the boards. The barrier plate eliminates any potential for EMI and RFI noise between the two boards. The radar module enclosure cavities are accessible by removing the top cover plate.

A first (or front) antenna array 114 is mechanically coupled to the cart 104 and electrically coupled to the radar electronics module 110, 112. The first antenna array 114 is oriented to radiate into the ground and receive radiation from the ground. A second (or back) antenna array 116 is mechanically coupled to the cart 104 and electrically coupled to the radar electronics module 110, 112. The second antenna array 116 is oriented to radiate into the ground and receive radiation from the ground.

The two antenna arrays 114 and 116 are coupled to the cart 104 by an antenna framework 118. The antenna arrays 114 and 116 and the antenna framework 118 can be removed from the cart 104 for diagnostics and transport. The height of the antenna arrays 114 and 116 above the ground may be adjusted by a machine screw jack 120 to be, in a preferred embodiment, between six inches and twenty inches. A drill motor 122 drives the machine screw jack 120 to raise and lower the antenna arrays. The drill motor 122 could be replaced by any type of motor that has sufficient power to raise and lower the antenna arrays. The antenna framework 118 offsets the antenna banks (in a preferred embodiment by 24 inches) from the cart 104 frame to eliminate any possibility of target shadowing by the frame.

Figure 2:
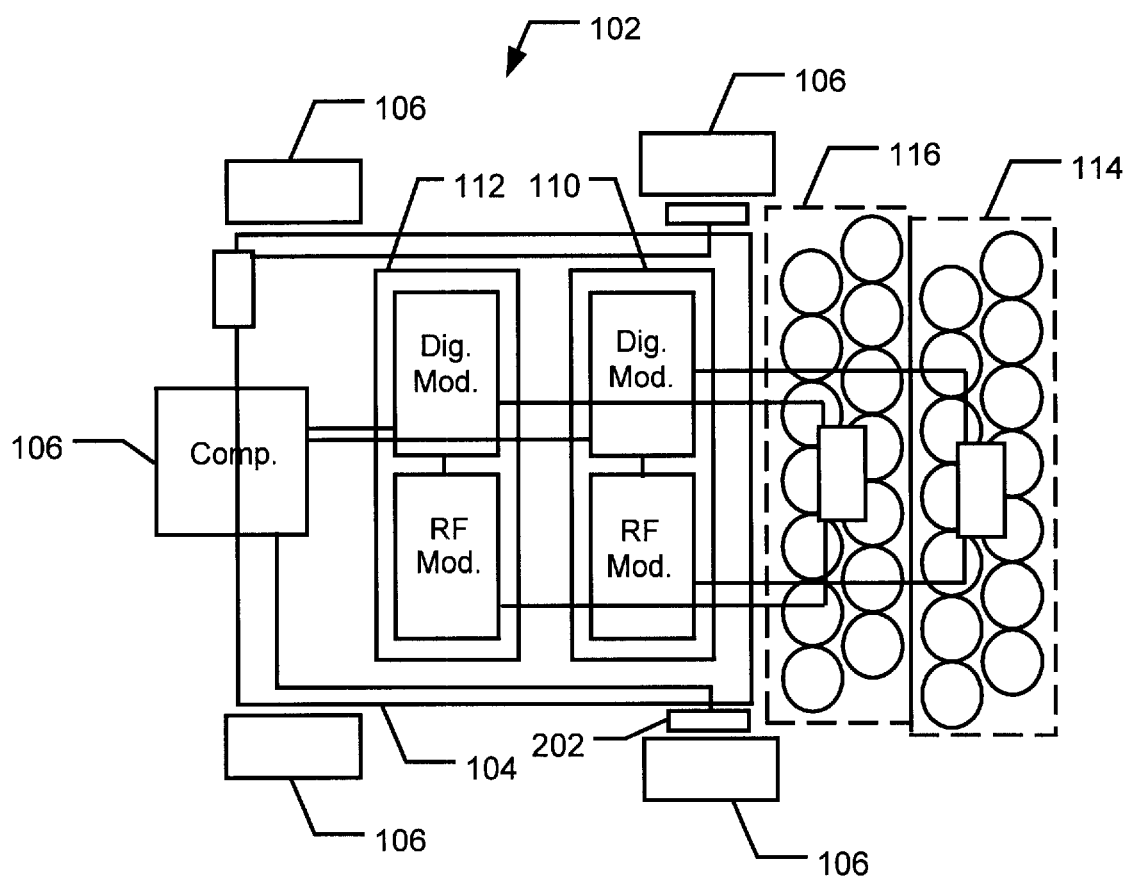
FIG. 2 is a block diagram of a ground penetrating radar system.

A movement detector 202, shown in FIG. 2, coupled to the computer detects movement of the cart 104. In the preferred embodiment, the movement detector 202 is an optical encoder mounted on the front right wheel of the cart 104.

The computer 108 triggers the radar electronics module 110, 112 when the computer 108 detects that the cart 104 has moved a predefined distance. In this way, data can be acquired at prescribed intervals measured by the motion detector 202.

In a preferred embodiment, the radar electronics module 110, 112 includes two electronics modules. A first radar electronics module 110 is coupled to the first antenna array 114. A second radar electronics module 112 is coupled to the second antenna array 116.

Figure 3:
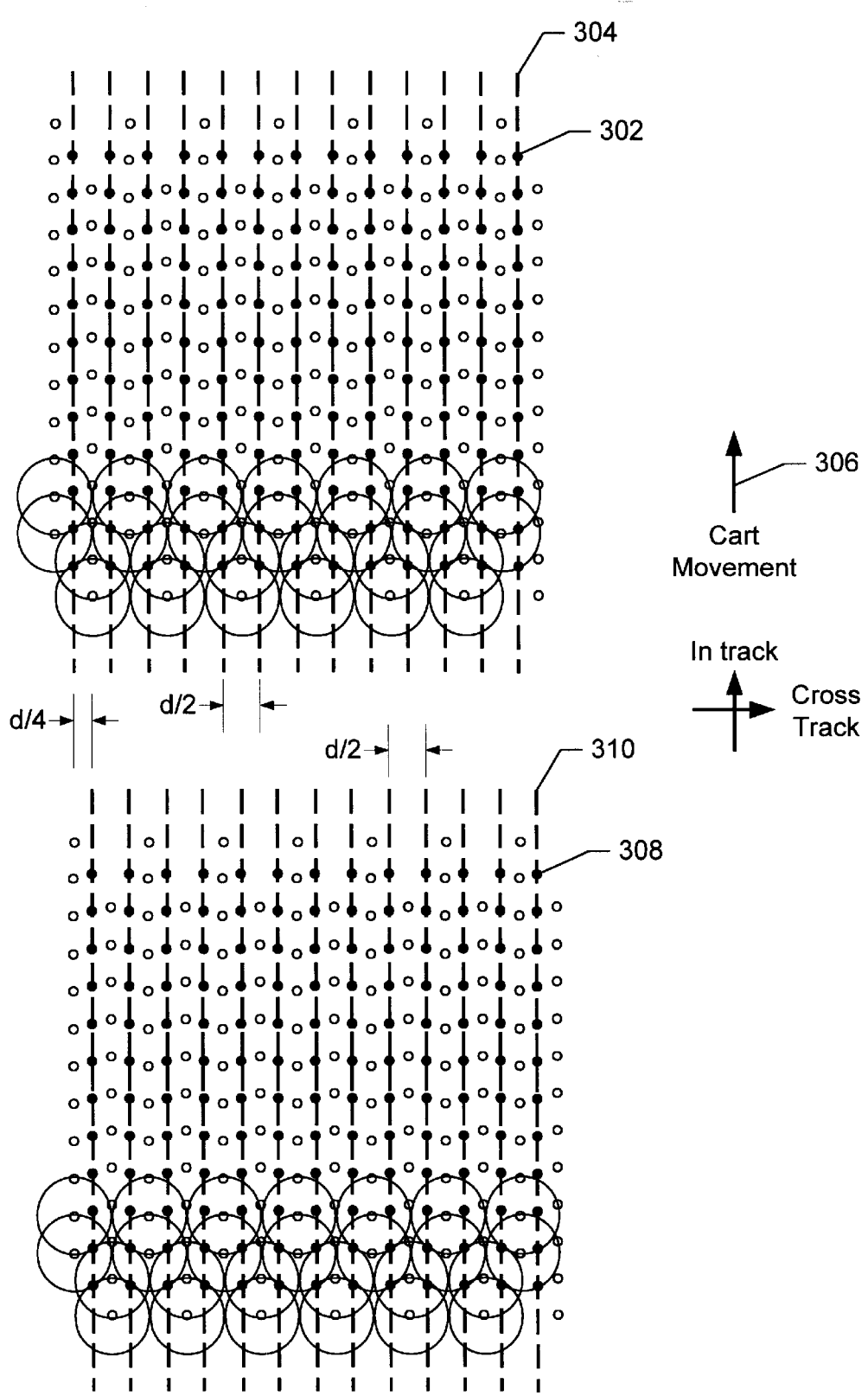
FIG. 3 illustrates the grid of radar data collected by a ground penetrating radar system.

The first antenna array 114 radiates and receives radiation from a first series of points, e.g. 302 shown in FIG. 3, along a first set of curves 304 parallel to the direction of movement 306 of the cart 104. In FIG. 3, the open circles represent the locations of the centers of the transmit and receive antennas when they take a radar sample, as described below. The closed, or filled, circles represent the location of the samples. In a preferred embodiment, the curves in the first set of curves 304 are approximately d/2, or 2.76 inches, apart.

Similarly, the second antenna array 116 radiates and receives radiation from a second series of points, e.g. 308, along a second set of curves 310 parallel to the direction of movement 306 of the cart 104. Note that in FIG. 3, the second antenna array 116 is shown a large distance behind the first antenna array 114. Actually, the two arrays are preferably arranged in much closer proximity to each other, as shown in FIGS. 1 and 2 and as discussed below in the discussion of FIG. 4. In a preferred embodiment, the curves in the second set of curves 310 are approximately d/2, or 2.76 inches, apart. The first set of curves 304 is interleaved with the second set of curves 310. The result is a set of curves including the first set of curves 304 and the second set of curves 310, with the curves being approximately d/4, or 1.38, inches apart.

The parameter d in FIG. 3 denotes the outside diameter of an antenna. In a preferred embodiment, d=5.515 inches. The individual transmit and receive antennas are of the log spiral type and were designed to operate over the band 800-4000 MHz but actually radiate well down to 500 MHz. The antenna cavity is nine inches tall and is filled with radar absorbing material to minimize reflections from the top of the antenna. The transmit and receive antennas have different windings in order to minimize cross coupling during the simultaneous transmission and reception required by a stepped-frequency radar.

Figure 4:
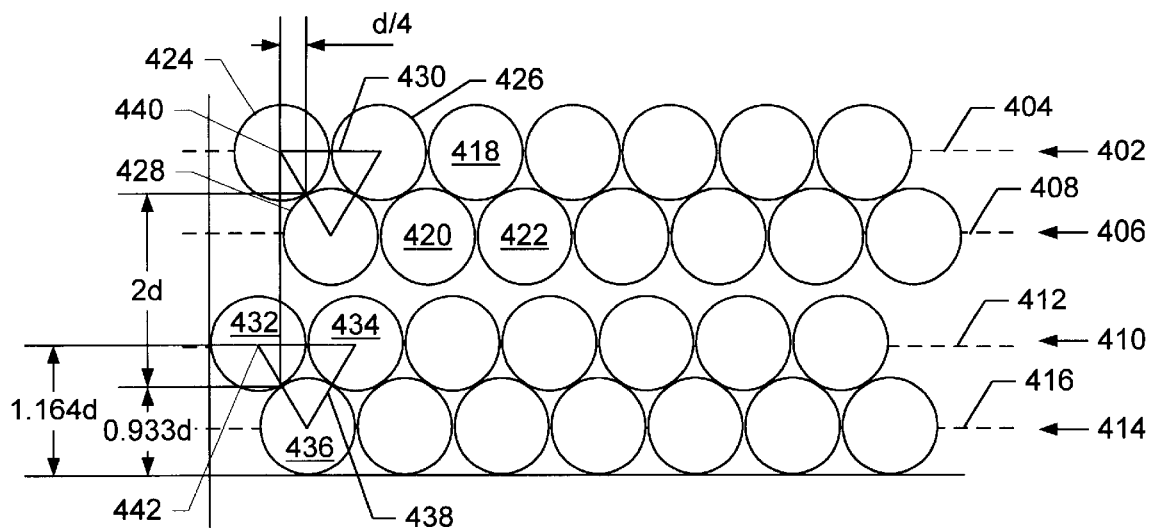
FIG. 4 illustrates the geometry of antenna arrays incorporated in the ground penetrating radar system.

The first antenna array 114 includes a first bank of receive antennas 402 arranged along a first axis 404 and a first bank of transmit antennas 406 arranged along a second axis 408 substantially parallel to the first axis and horizontally displaced from the first axis, as shown in FIG. 4. The second antenna array 116 includes a second bank of receive antennas 410 arranged along a third axis 412 substantially parallel to the first axis 404 and horizontally displaced from the first axis 404 and a second bank of transmit antennas 414 arranged along a fourth axis 416 substantially parallel to the first axis 404 and horizontally displaced from the first axis 404.

In a preferred embodiment, the first radar electronics module 110 is coupled to the first bank of receive antennas 402 and the first bank of transmit antennas 406. The second radar electronics module 112 is coupled to the second bank of receive antennas 410 and the second bank of transmit antennas 414.

As can be seen in FIG. 4, the receive antennas in the first bank of receive antennas 402 are interleaved with the transmit antennas in the first bank of transmit antennas 406. Similarly, the receive antennas in the second bank of receive antennas 410 are interleaved with the transmit antennas in the second bank of transmit antennas 414.

Further, the receive antennas in the first bank of receive antennas 402 are offset along the first axis 404 from the receive antennas in the second bank of receive antennas. Similarly, the first bank of transmit antennas 406 is offset with respect to the second bank of transmit antennas 414. The banks of transmit antennas 406, 414 alternate with the banks of receive antennas 402, 410.

Each receive antenna, e.g. 418, is adjacent to at least one transmit antenna, e.g. 420, 422. Each receive antenna, e.g. 418, is oriented to minimize electromagnetic coupling with at least one of its adjacent transmit antennas, e.g. 420, 422.

Figure 5:
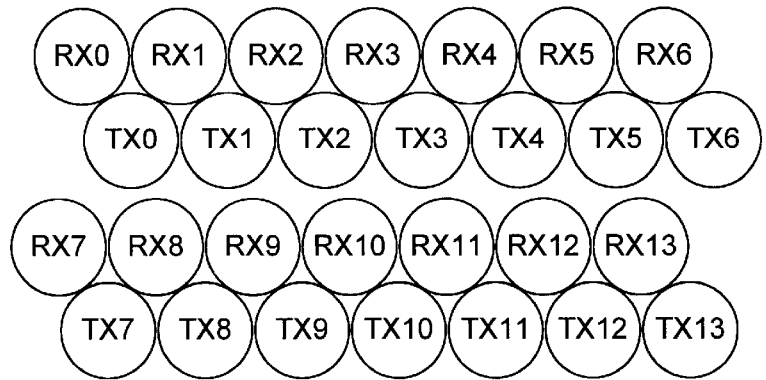
FIG. 5 illustrates the switching among the antennas within the antenna arrays.

The close spacing of the curves 304 and 310, shown in FIG. 3, is accomplished through the interleaving of the transmit and receive banks of antennas, as discussed above, and by sharing the transmit and receive antennas within the same bank. Each transmit antenna transmits to its two adjacent receive antennas, as shown in FIG. 5. The transmit/receive sequence for the first antenna array is TX0-RX0, TX0-RX1, TX1-RX1, TX1-RX2, . . . , TX6-RX6. The transmit/receive sequence for the second antenna array is similar. Each time a transmitter/receiver pair (such as TX0-RX0) is energized, a sample of radar data is taken. By moving the cart in the cart movement direction 306 and taking samples at regular distance intervals (measured by the movement detector 202), an array of data may be acquired. Further, samples at a number of frequencies are taken at each sample location.

The data structure produced by this process is a complex array of numbers of the form y(m,n,p) where m is the cross-track index (m=1,2, . . . ,26), n is the row or scan index and p is the frequency index. The quantity y(m,n,p) is the complex frequency response of the ground at the location (m,n). It is the quantity measured by the stepped-frequency radar. The Fourier transform of y(m,n,p) is the equivalent time domain response of the radar at location (m,n).

Figure 6:
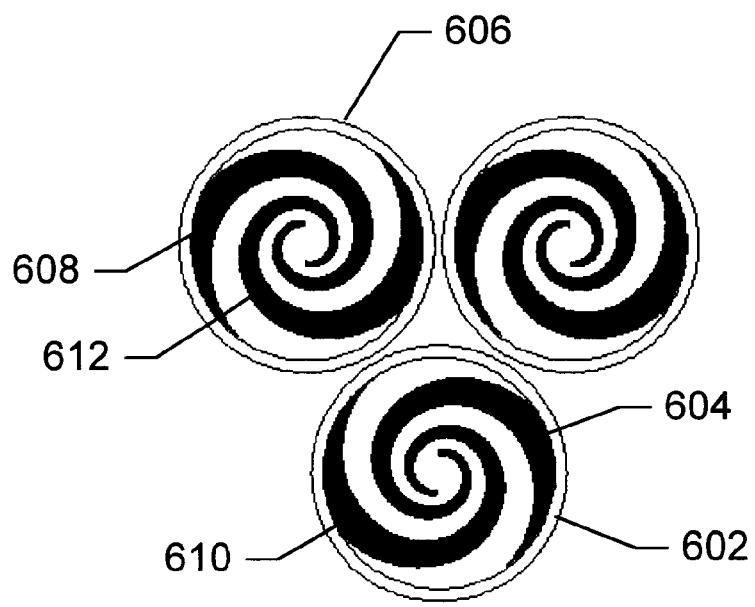
FIG. 6 illustrates the configuration of the antennas.
Figure 7:
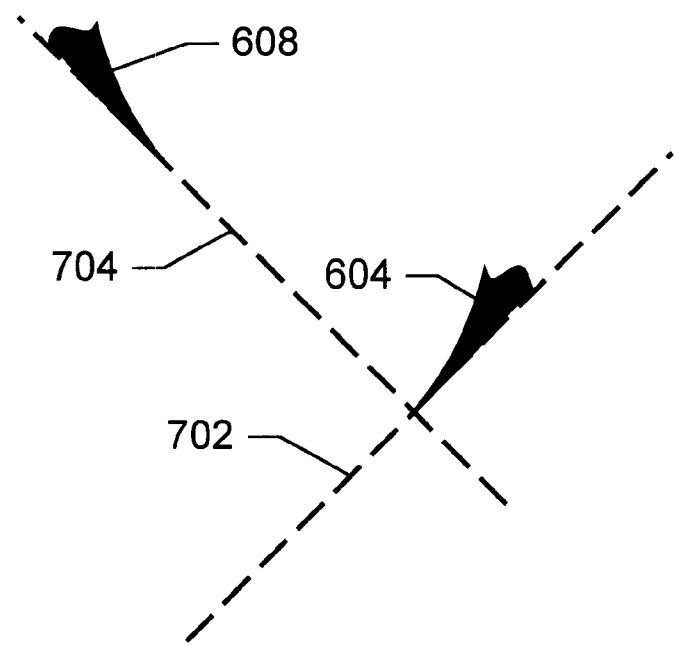
FIG. 7 illustrates the relative orientation of a transmit antenna and a receive antenna.

Each transmit antenna 602, illustrated in FIG. 6, includes at least one spiral arm 604 of conductive material. Similarly, each receive antenna, e.g. 606, includes at least one spiral arm 608 of conductive material.

The transmit antenna 602 and one of its adjacent receive antennas 606 are oriented so that a tangent 702 to the inside of the spiral arm 604 at the edge of a transmit antenna 602 is substantially perpendicular to a tangent 704 to the inside of the spiral arm 608 at the edge of a receive antenna 606 adjacent to the transmit antenna. This orientation minimizes electromagnetic cross coupling between the transmit antenna 602 and the receive antenna 606.

In a preferred embodiment, each transmit antenna, e.g. 602, includes two spiral arms 604, 610 of conductive material and each receive antenna 606 includes two spiral arms 608, 612 of conductive material.

As shown in FIG. 4, the transmit antennas, e.g. 424 and 426, and the receive antennas, e.g. 428, have faces. Each of the faces has a center. Two adjacent first bank receive antennas 424, 426 from the first bank of receive antennas 402 and a first bank transmit antenna 428 from the first bank of transmit antennas 406 interleaved between the two adjacent first bank receive antennas 424, 426 are positioned such that lines between the centers of the faces of the two adjacent first bank receive antennas 424, 426 and the interleaved first bank transmit antenna 428 form a first triangle 430 having sides of approximately the same length.

Two adjacent second bank receive antennas 432, 434 from the second bank of receive antennas 410 and a second bank transmit antenna 436 from the second bank of transmit antennas 414 interleaved between the two adjacent second bank receive antennas 432, 434 are positioned such that lines between the centers of the faces of the two adjacent second bank receive antennas 432, 434 and the interleaved second bank transmit antenna 436 form a second triangle 438 having sides of approximately the same length.

A vertex 440 of the first triangle 430 is displaced in the direction of the first axis 404 relative to a corresponding vertex 442 of the second triangle 438 by an amount substantially equal to one-half the distance from the center of one side of the first triangle 432 to the center of another side of the first triangle 432.

In a preferred embodiment, the third axis 412 is horizontally displaced from the first axis 404 by an amount substantially equal to eight times the distance from the center of one side of the first triangle 432 to the center of another side of the first triangle 432.

In a preferred embodiment, neither the transmit antennas, e.g. 420, nor the receive antennas, e.g. 422, are required to be in contact with the ground when in operation.

In a preferred embodiment, the ground penetrating radar system operates in a continuous wave mode. The first and second radar electronics modules 110, 112 generate a frequency-stepped radar signal and receive and analyze the return signal.

Figure 8:
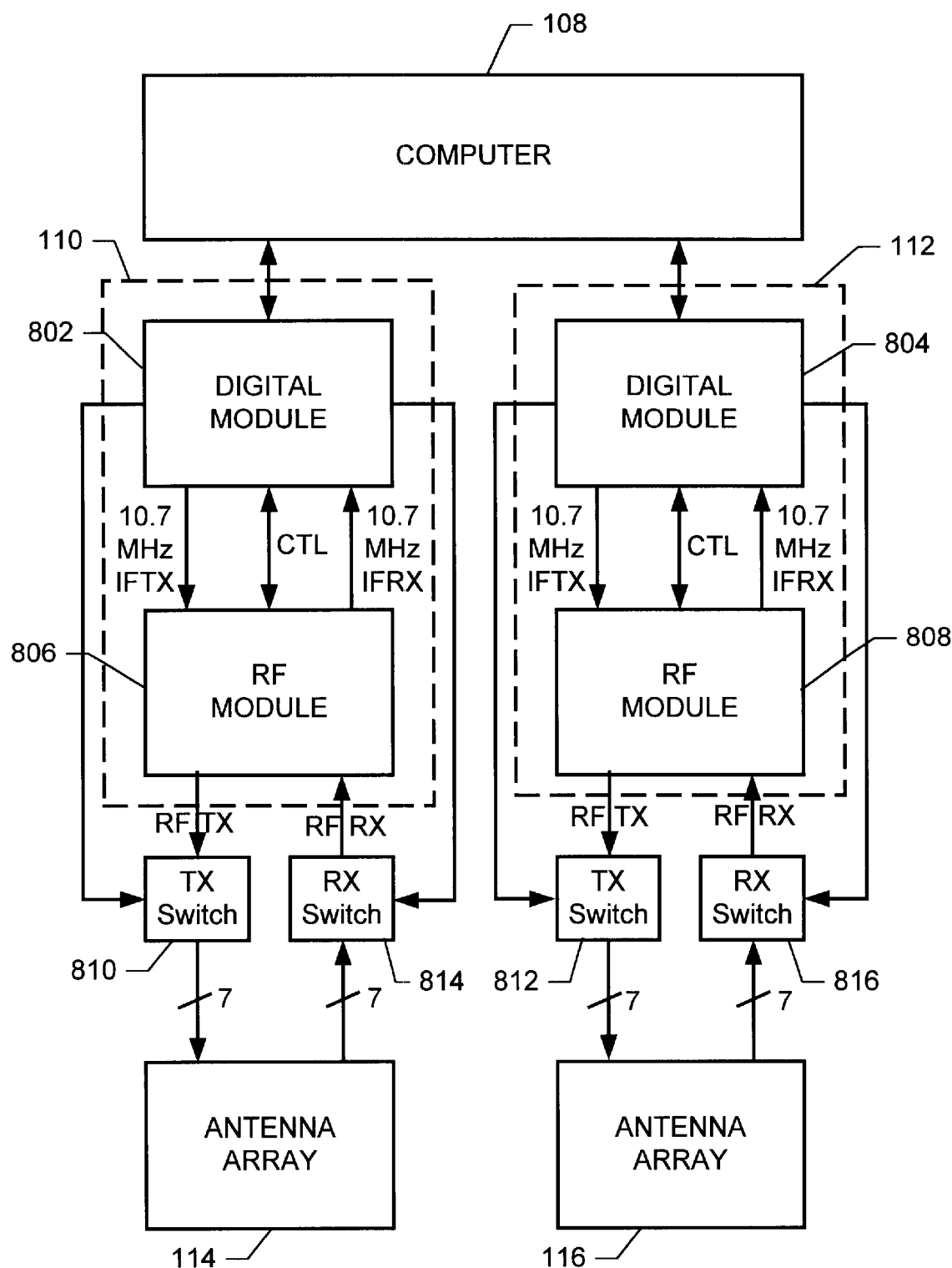
FIG. 8 is a block diagram of the electronics in a ground penetrating radar system.

The first and second radar electronics modules 110, 112 in the ground penetrating radar system each include a digital module 802, 804 coupled to the computer 108, and an RF module 806, 808 coupled to the digital module 802, 804, as shown in FIG. 8. The digital module 802, 804 generates an IF signal, which in the preferred embodiment has a frequency of 10.7 MHz. The RF module 806, 808, under the control of the digital module 802, 804, converts the IF signal to a stepped-frequency signal, RFTX, which is provided to a transmit switch 810. The transmit switch 810, 812 provides the RFTX signal to one transmit antenna in its respective first or second antenna array 114, 116 which radiates a signal into the ground.

A stepped frequency return signal is received by the antenna array 114, 116 and routed to a receiver switch 814, 816. The receiver switch 814, 816 selects a receive antenna from which to receive the returned signal and routes the signal to the RF module 806, 808. The RF module 806, 808, under the control of the digital module 802, 804, converts the stepped frequency return signal into a receive IF signal, which in the preferred embodiment has a frequency of 10.7 MHz. The digital module 802, 804 demodulates the IF signal and provides the result to the computer 108 for storage and processing.

Figure 9:
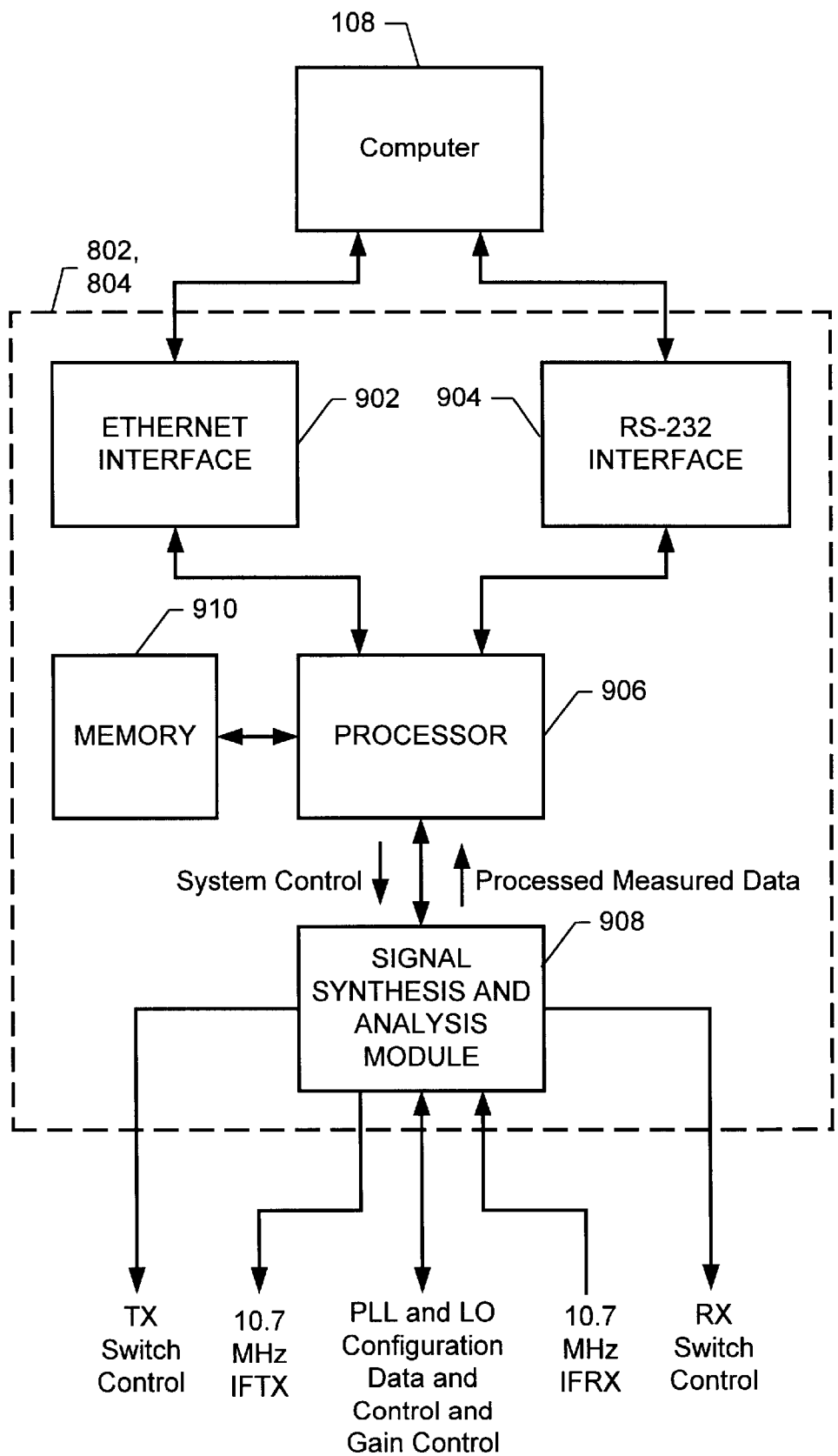
FIG. 9 is a block diagram of a digital module.

The digital module 802, 804, illustrated in more detail in FIG. 9, includes an extensible network interface 902, which in the preferred embodiment is a local area network, e.g., ETHERNET, interface, and a point-to-point communication interface 904, which in the preferred embodiment is an RS-232 interface. Both the extensible network interface 902 and the point-to-point communication interface 904 allow communication between the computer 108 and a processor 906 within the digital module 802, 804 for communicating configuration commands and data from the computer 108 to the digital module 802, 804 and for communicating status and collected and processed data from the digital module 802, 804 to the computer 108. Data and program code for the processor 906 are stored within the digital module on a memory 910. A signal synthesis and analysis module 908 synthesizes the transmit IF signal, controls the transmitter switch 810, 812, controls the up- and down-conversion performed in the RF module 806, 808, demodulates the receive IF signal, and controls the receiver switch 814, 816.

Figure 10:
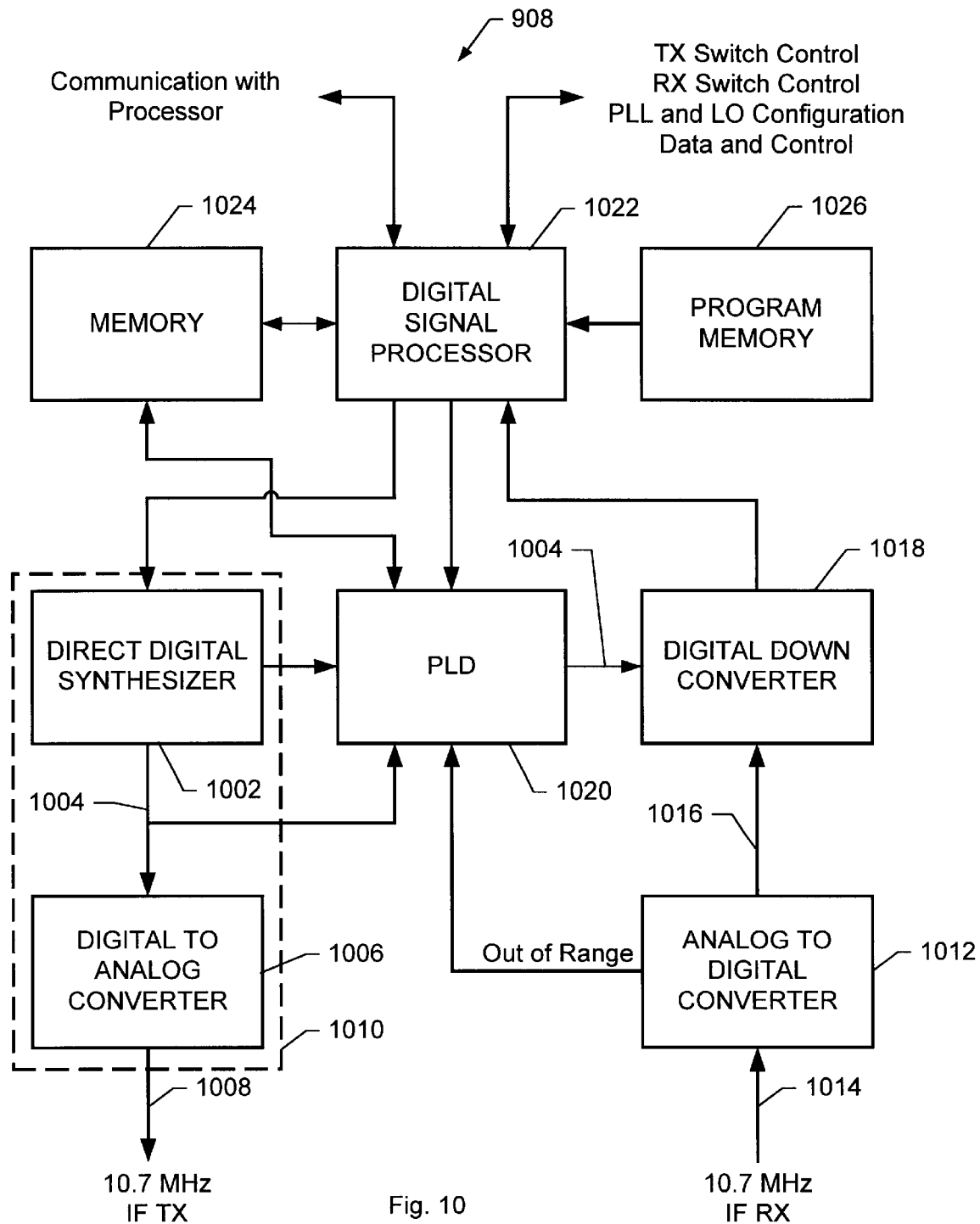
FIG. 10 is a block diagram of an embodiment of the signal synthesis and analysis module within a digital module.

The signal synthesis and analysis module 908, shown in more detail in FIG. 10, includes a direct digital synthesizer 1002, which generates a digital IF reference signal 1004. A digital to analog converter 1006 converts the digital IF signal to an analog IF transmit signal 1008. In a preferred embodiment, the analog IF transmit signal 1008 is a 10.7 MHz IF signal. In a preferred embodiment, the direct digital synthesizer 1002 and the digital to analog converter 1006 are incorporated into a single module 1010, such as the AD7008 manufactured by Analog Devices. The AD7008 includes a 10-bit analog to digital converter.

The digital IF reference signal 1004 provides a stable and accurate reference for both the transmit and receive paths of the apparatus. As will be seen, the digital IF reference signal 1004 is used in the down conversion process without the necessity of applying delays.

The signal synthesis and analysis module 908 also includes an analog to digital converter 1012 which digitizes the analog IF receive signal 1014 to produce a digital IF receive signal 1016. The digital IF receive signal 1016 is routed to a digital down converter 1018 which digitally mixes the digital IF receive signal 1016 with the digital IF reference signal 1004 from the direct digital synthesizer 1002 through a programmable logic device (PLD) 1020. The PLD 1020 provides control logic and interfacing for the direct digital synthesizer 1002 and the digital down converter 1018 and a digital signal processor (DSP) 1022. The DSP 1022 controls the direct digital synthesizer 1002, the digital down converter 1018, and the other peripherals in the system. The PLD also receives an Out of Range signal from the analog to digital converter 1012, which it communicates to the DSP 1022. The DSP 1022 reacts by changing the gain in the receive chain, as discussed below.

Figure 11:
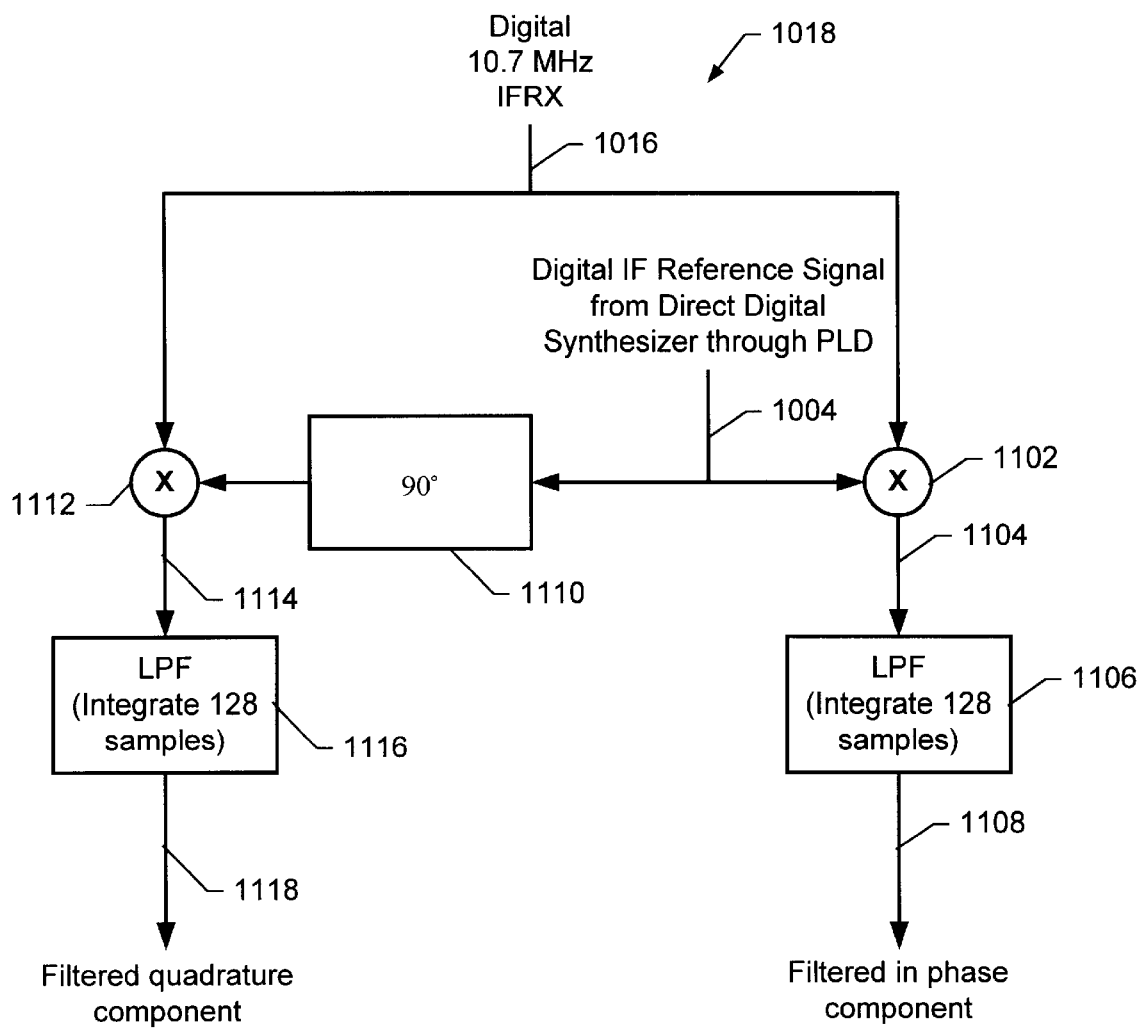
FIG. 11 is a block diagram of a digital down-converter.

The digital down converter 1018 digitally mixes 1102 the digital IF reference signal 1004 with the digital IF receive signal 1016 to produce an in-phase product 1104, as shown in FIG. 11. The in-phase product 1104 is then digitally filtered by a low pass filter 1106 to produce a filtered in phase component 1108 which is transferred to the DSP 1022 for processing and storage.

The digital down converter 1018 also digitally shifts the phase of the digital IF reference signal by ninety degrees 1110 and digitally mixes 1112 it with the digital IF receive signal 1016 to produce a quadrature product 1114. The quadrature product 1114 is then digitally filtered through a low pass filter 1116 to produce a filtered quadrature component 1118 which is passed to the DSP 1022 for processing and storage.

In a preferred embodiment, the low pass filters 1106 and 1116 perform their functions by integrating a moving window of input data. In one embodiment, the window is 128 signals wide.

Returning to FIG. 10, the signal synthesis and analysis module 908 includes a memory 1024 where the DSP 1022 and the PLD 1020 store data. The signal synthesis and analysis module 908 also includes a program memory 1026 where program code for the DSP 1022 is stored.

Figure 12A:
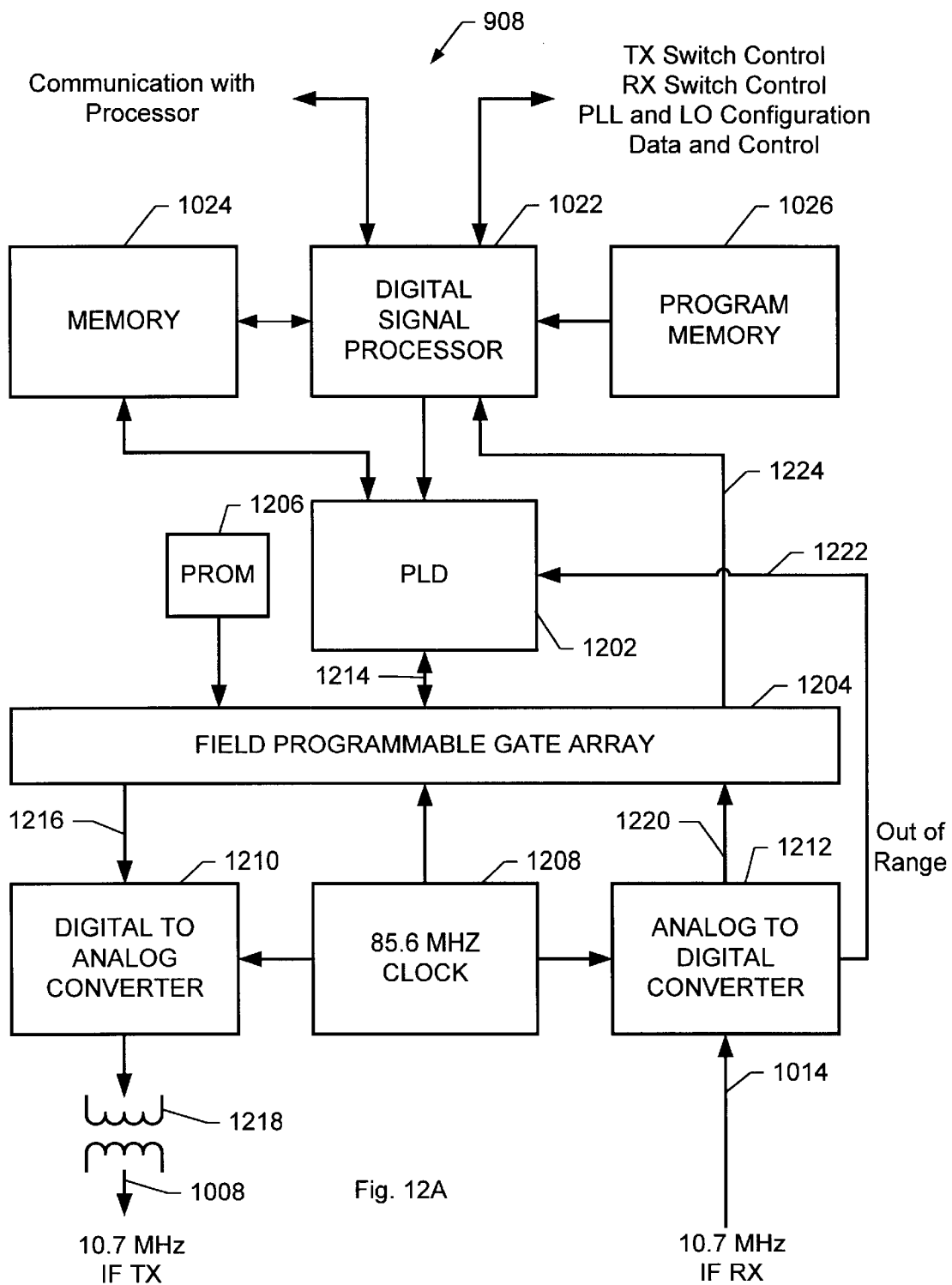
FIG. 12A is a block diagram of an embodiment of the signal synthesis and analysis module within a digital module.

Another example embodiment of the digital module 908 is illustrated in FIG. 12A. The DSP 1022, the memory 1024 and the program memory 1026 remain in the same configuration as shown in FIG. 10. The data and programs stored in the memory 1024 and the program memory 1026 may be different from the data and programs stored in the same elements in FIG. 10. A PLD 1202 provides a control logic interface between the DSP 1022 and a field programmable gate array (FPGA) 1204. A memory 1206, preferably a programmable read only memory (PROM), stores the FPGA boot program. A clock 1208, preferably an 85.6 MHz clock, provides a clock signal to the FPGA, a digital to analog converter (DAC) 1210 and an analog to digital converter (ADC) 1212. The FPGA 1204 is controlled by the PLD 1202, which in turn is controlled by the DSP 1022, through control lines 1214.

The FPGA 1204 generates a digital IF reference signal 1216. The DAC 1210 converts the digital IF reference signal 1216 to an analog signal which is isolated by transformer 1218 and provided as the analog IF transmit signal 1008.

The analog IF receive signal 1014 is converted by the ADC 1212 to a digital receive signal 1220 which is provided to the FPGA 1204. The ADC 1212 also produces an out of range signal 1222 if the analog IF receive signal 1014 exceeds the range of the ADC 1212.

The FPGA 1204 produces received data 1224 which is transferred to the DSP 1022 for processing.

Figure 12B:
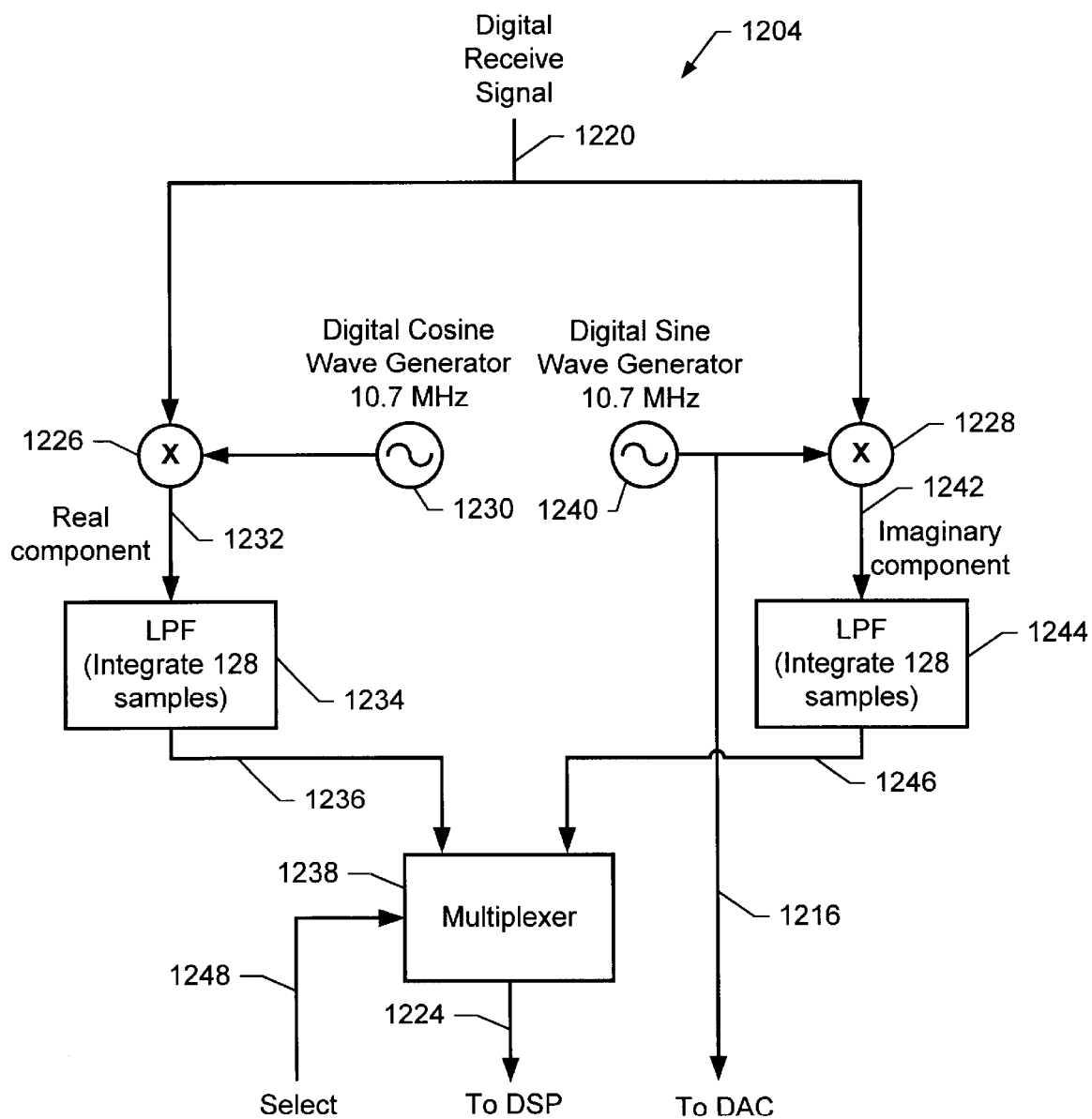
FIG. 12B is a block diagram of a field programmable gate array.

In one example embodiment of the FPGA, illustrated in FIG. 12B, the digital receive signal 1220 is provided to two digital mixers 1226 and 1228. The first digital mixer 1226 mixes the digital receive signal 1220 with a digital cosine wave 1230 having a frequency, in one preferred embodiment, of 10.7 MHz. The output of the first digital mixer 1226 is the real component 1232 of the digital receive signal 1220. The real component 1232 is filtered 1234, preferably by summing a 128 sample moving window of data, to produce a filtered real component signal 1236 which is provided to a multiplexer 1238.

The second digital mixer 1228 mixes the digital receive signal 1220 with a digital sine wave 1240 having a frequency, in one preferred embodiment, of 10.7 MHz. Preferably, the digital sine wave 1240 is identical to the digital cosine wave 1230 except that the digital sine wave 1240 is shifted ninety degrees in phase with respect to the digital cosine wave 1230. The output of the first digital mixer 1228 is the imaginary component 1242 of the digital receive signal 1220. The imaginary component 1242 is filtered 1244, preferably by summing a 128 sample moving window of data, to produce a filtered imaginary component signal 1246 which is provided to the multiplexer 1238.

The digital sine wave 1240 is also provided as the digital IF reference signal 1216.

The multiplexer 1238 provides to the DSP 1022 either the filtered real component signal 1236 or the filtered imaginary component signal 1246, depending on the select signal 1248.

Figure 13:
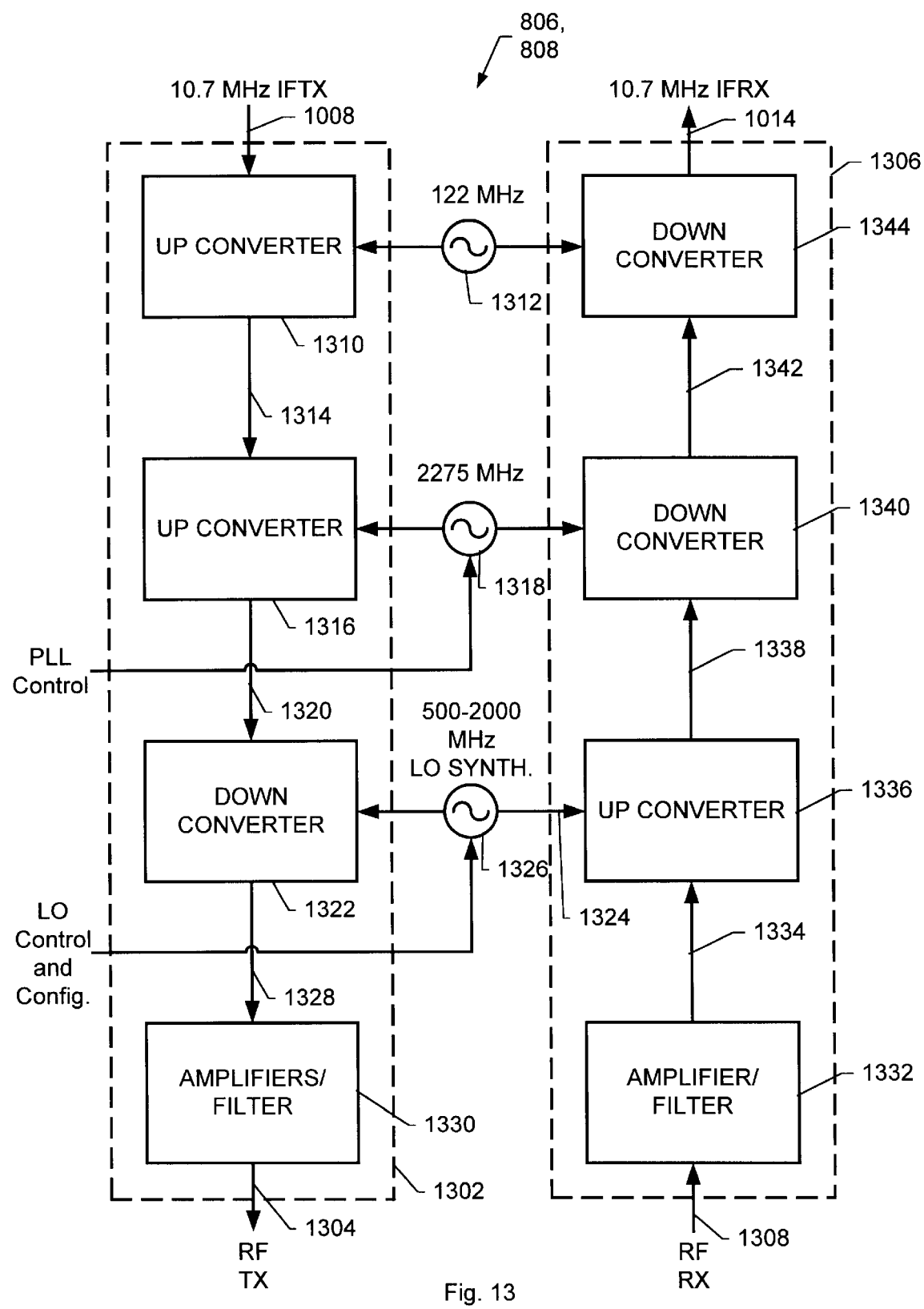
FIG. 13 is a block diagram of the RF module.

The RF module 806, 808, shown in more detail in FIG. 13, includes a triple-heterodyne up-converter 1302 for converting the analog IF transmit signal 1008 into a stepped-frequency transmit signal 1304. The RF module 806, 808 also includes a triple-heterodyne frequency converter 1306 for converting a stepped frequency receive signal 1308 into the analog IF receive signal 1014.

Figure 14:
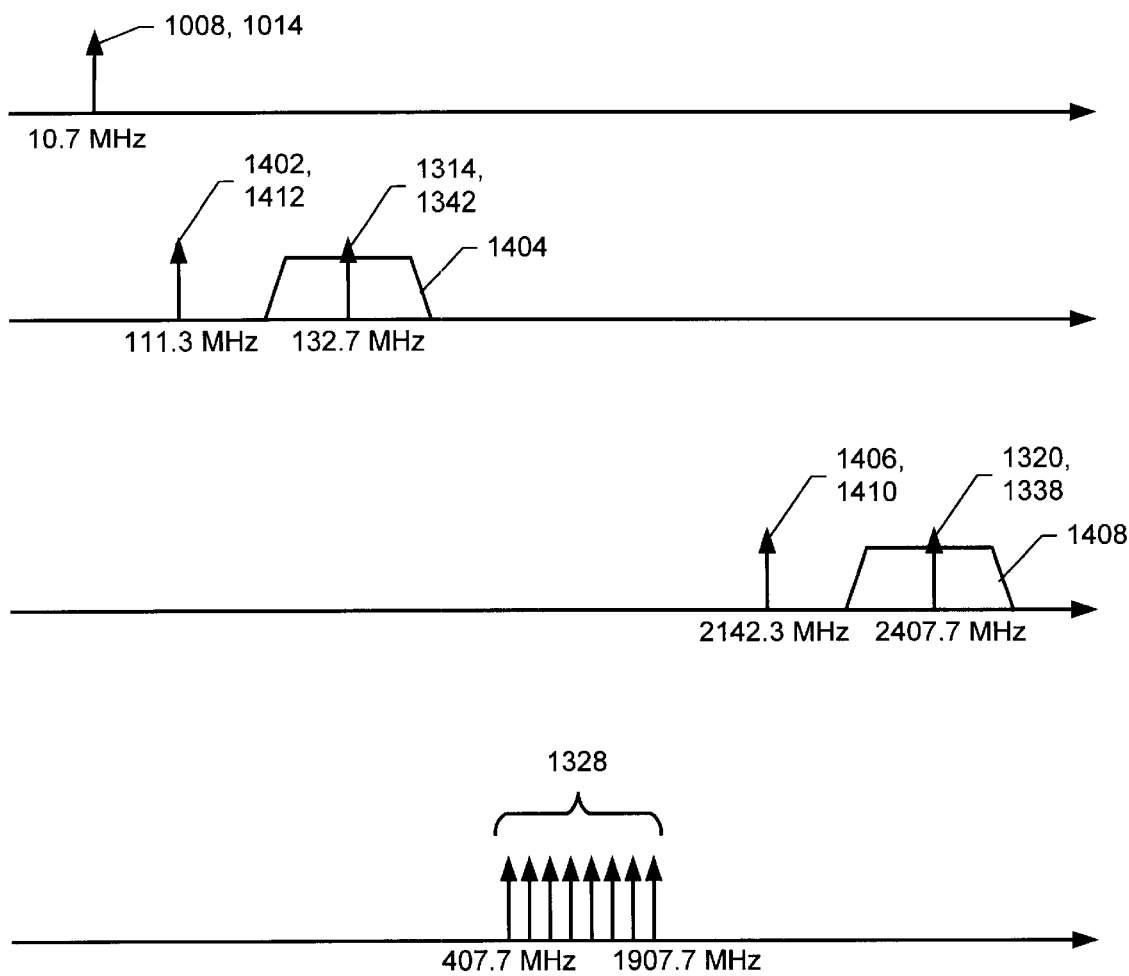
FIG. 14 is a frequency plan for a preferred embodiment of the ground penetrating radar system.
Figure 16:
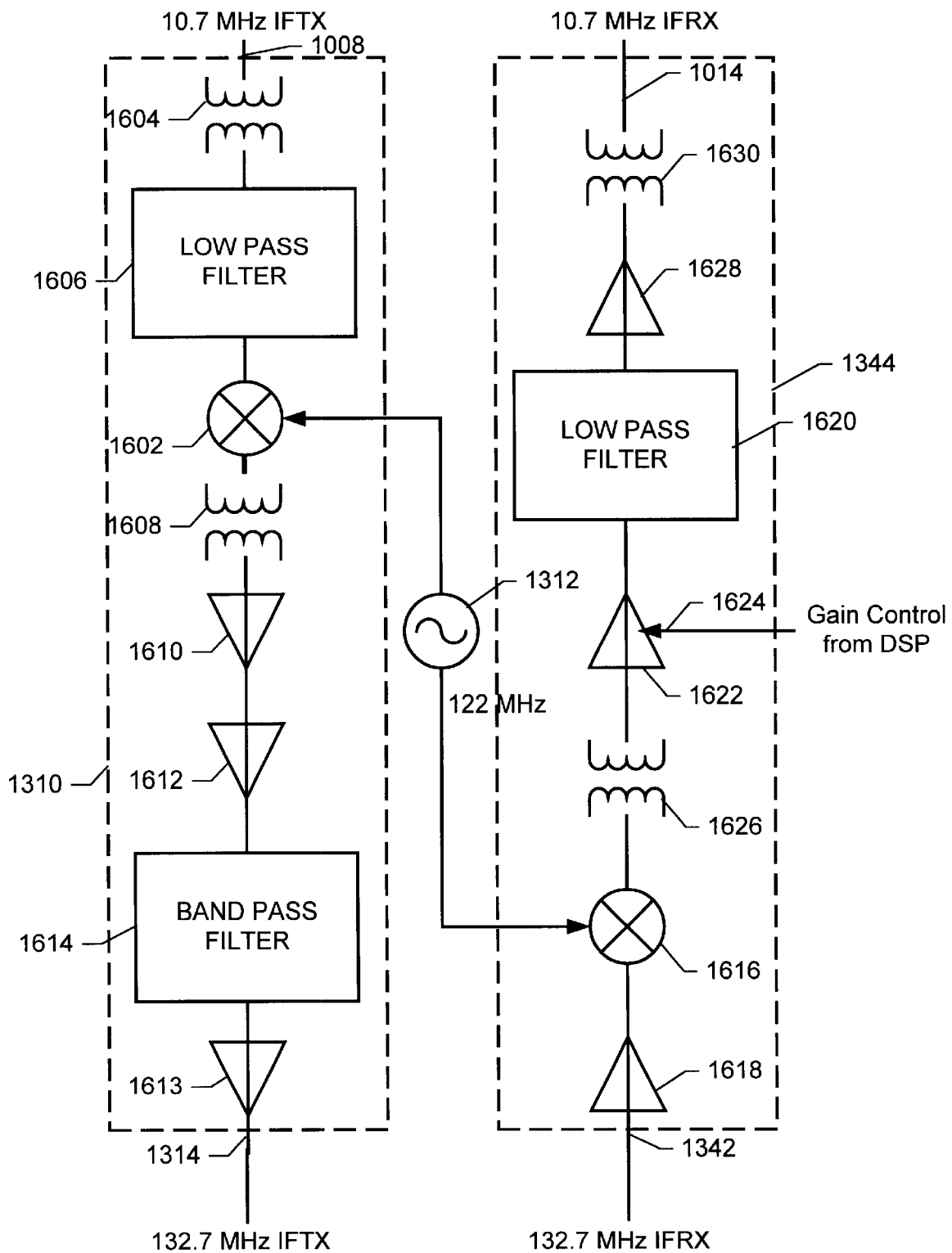
FIG. 16 is a block diagram of the first stage in a triple-heterodyne frequency up-converter and the last stage in a triple-heterodyne frequency converter.

The triple-heterodyne up-converter 1302 includes a first up-converter 1310. The first up-converter 1310 includes a mixer 1602, as shown in FIG. 16, which mixes the analog IF transmit signal 1008 (after it has been isolated by transformer 1604 and filtered by low pass filter 1606) with the signal from a first local oscillator 1312 to produce a first intermediate signal 1314 and an aliased first intermediate signal 1402, as shown in FIG. 14. These two signals are isolated by transformer 1608 and amplified by amplifiers 1610, 1612 and 1613. A filter 1614, having a pass band 1404, shown in FIG. 14, substantially rejects the aliased first intermediate signal 1402. In the preferred embodiment, the first local oscillator 1312 operates at a frequency of 122 MHz and when mixed with the 10.7 MHz IF produces mixing products at 111.3 MHz and 132.7 MHz. In the preferred embodiment, the filter 1614 has a center frequency of 139.75 MHz and passes the 132.7 MHz mixing product.

Figure 17:
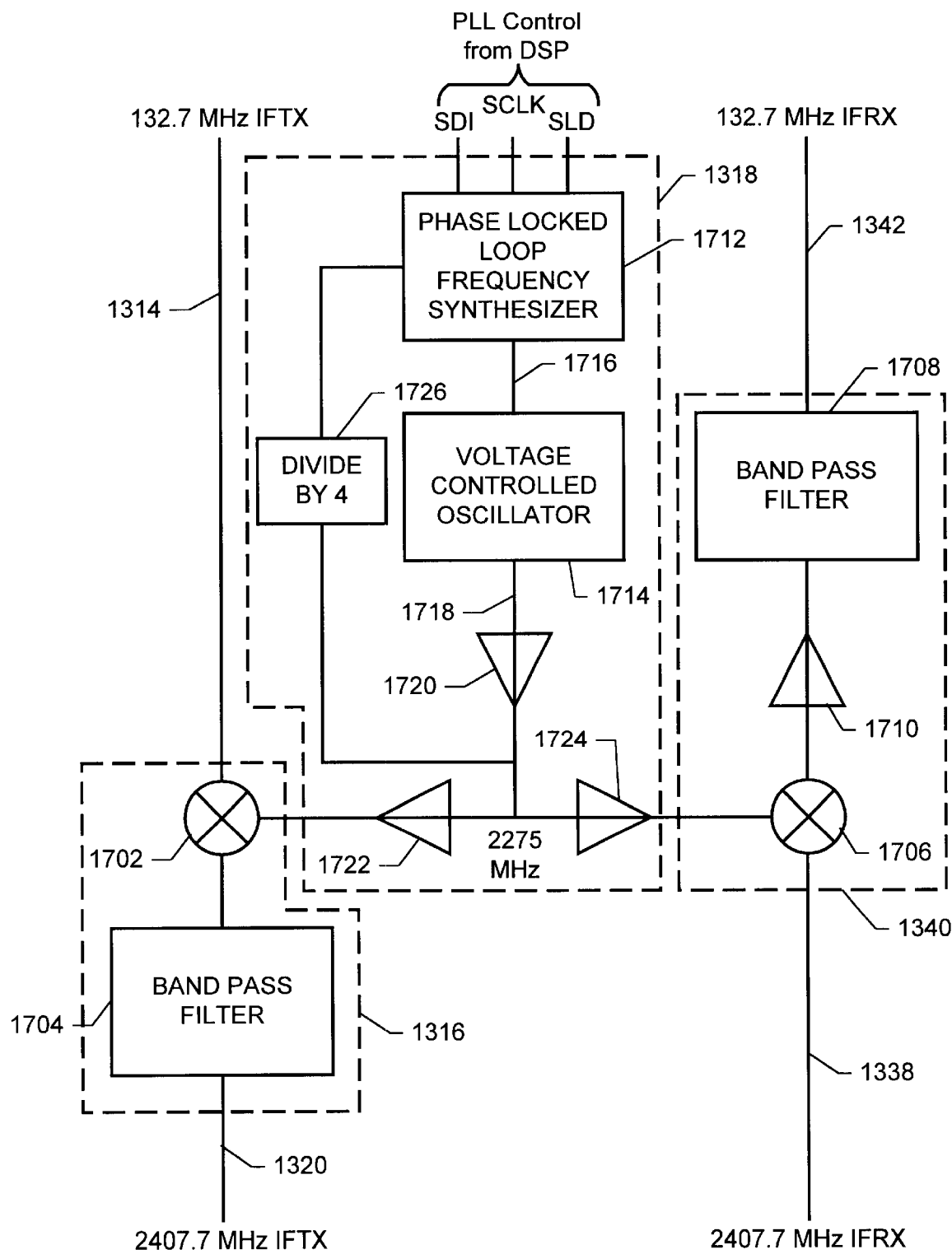
FIG. 17 is a block diagram of a middle stage in a triple-heterodyne frequency up-converter and the middle stage in a triple-heterodyne down-converter.

A second up-converter 1316 includes a mixer 1702, as shown in FIG. 17, which mixes the first intermediate signal 1314 with the signal produced by the second local oscillator 1318 to produce a second intermediate signal 1320 and an aliased second intermediate signal 1406, as shown in FIG. 14. A filter 1704 substantially rejects the aliased second intermediate signal 1406. In the preferred embodiment, the second local oscillator 1318 operates at a frequency of 2275 MHz and when mixed with the first intermediate signal 1314 produces mixing products at 2142.3 MHz and 2407.7 MHz. In the preferred embodiment, the filter 1704 has a center frequency of 2450 MHz and passes the 2407.7 MHz product.

Figure 18:
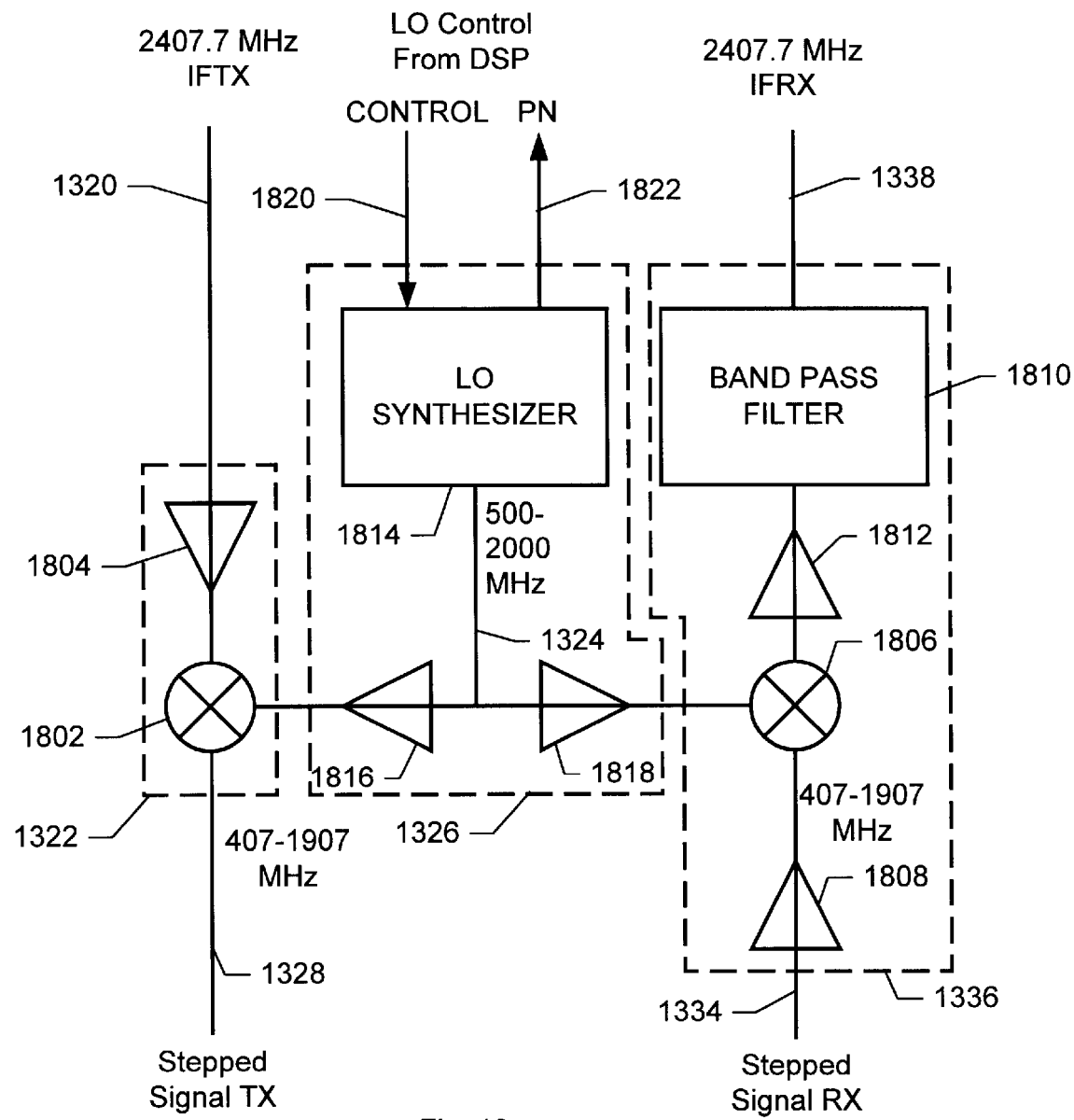
FIG. 18 illustrates the last stage in a triple-heterodyne frequency up-converter and the first stage in a triple-heterodyne frequency converter.

A down-converter 1322 includes a mixer 1802, shown in FIG. 18, that mixes the second intermediate signal 1320 (after being amplified by amplifier 1804) with a stepped frequency signal 1324 generated by a synthesizer 1326 to produce the stepped-frequency transmit signal 1328 and an aliased stepped-frequency transmit signal (not shown in FIG. 14). The stepped-frequency transmit signal has substantially no frequency components in the pass bands of the first filter 1614 or the second filter 1704. A third filter 1902, shown in FIG. 19, substantially rejects the aliased stepped-frequency transmit signal (after it is amplified by amplifier 1904). Amplifier 1906 amplifies the output of the third filter 1902 to produce the stepped-frequency transmit signal 1304. In the preferred embodiment, the third filter 1902 is a low pass filter with a 3 dB break point at 2000 MHz.

Figure 15:
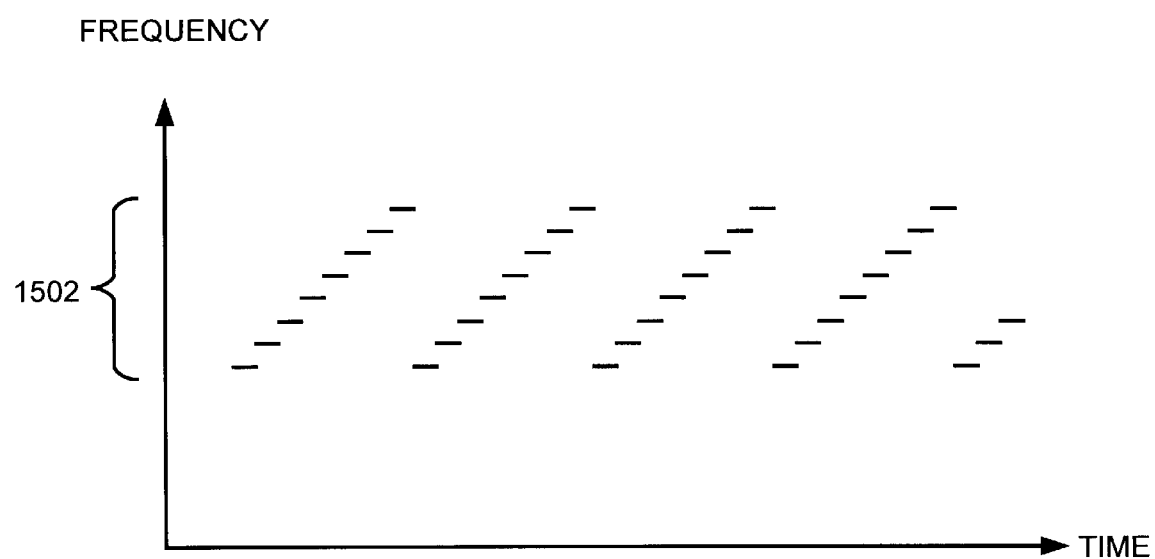
FIG. 15 illustrates a stepped-frequency signal.

The synthesizer 1326 is controlled by the DSP 1022 through the LO Control and Configuration signals shown on FIG. 13 to produce a stepped-frequency signal 1324, illustrated in FIG. 15. The frequency of the stepped-frequency signal 1324 steps through a range of frequencies 1502 under the control of the DSP 1022. In the preferred embodiment the range of frequencies 1502 is from 500 to 2000 MHz. In the preferred embodiment, when the stepped-frequency signal 1324 is mixed with the second intermediate signal 1322 the result is a preamplified stepped-frequency transmit signal 1328 ranging from 407.7 MHz to 1907.7 MHz.

The triple-heterodyne up-converter 1302 includes amplifiers and filters 1330 which amplify and filter the preamplified stepped-frequency transmit signal 1328 before it is sent to the transmit switch 810, 812 and then to the antenna array 114, 116 as stepped-frequency transmit signal 1304.

Figure 19:
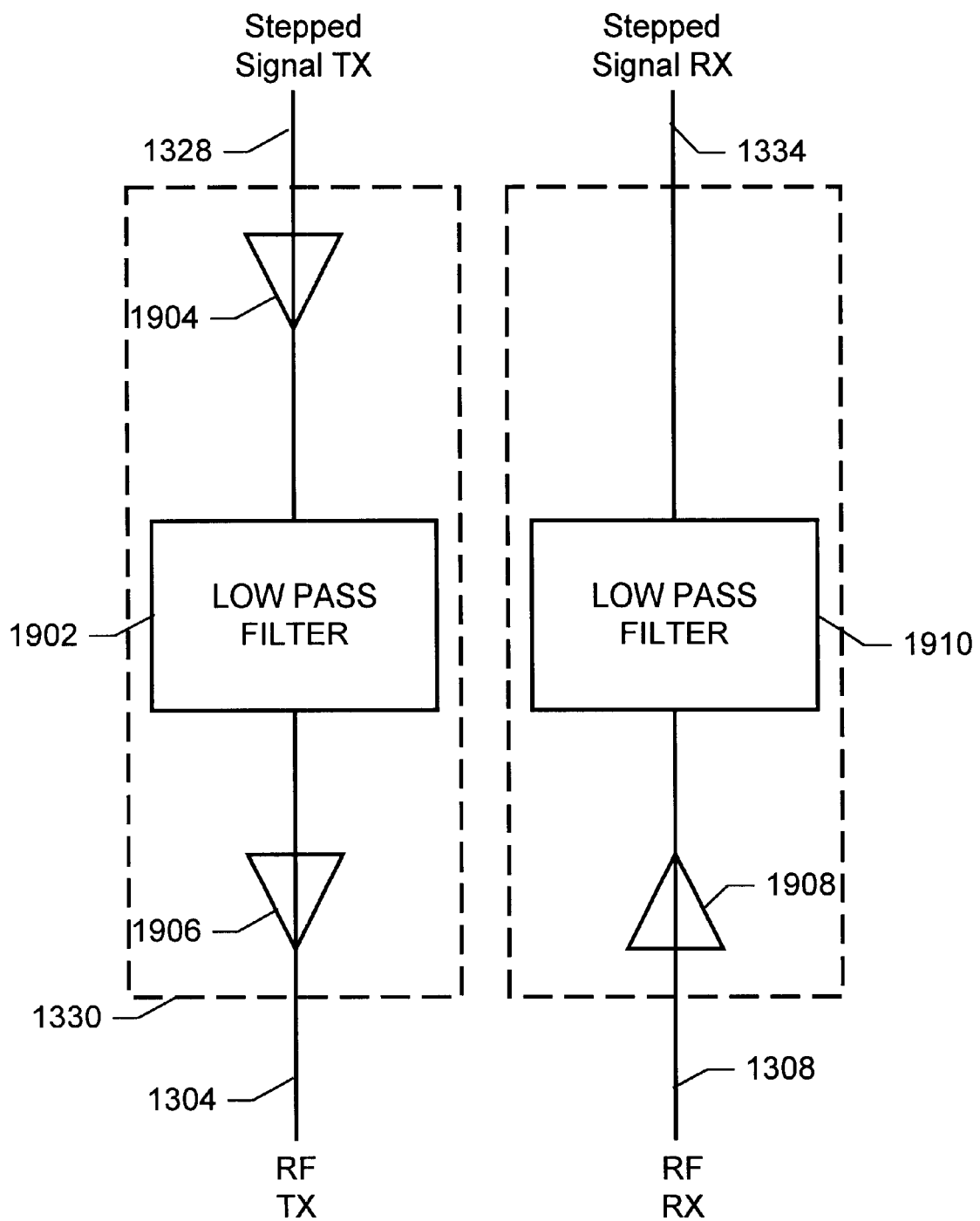
FIG. 19 is a block diagram of amplifiers and filters in the triple-heterodyne up-converter and the triple-heterodyne frequency converter.

The triple-heterodyne up converter 1306 includes an amplifier/filter 1332 that amplifies, using amplifier 1908, and filters, using filter 1910, the stepped-frequency receive signal 1308 to produce an amplified stepped-frequency received signal 1334, as illustrated in FIG. 19.

An up-converter 1336 uses mixer 1806 to mix the stepped-frequency receive signal 1334 (after amplification by amplifier 1808) with the stepped-frequency signal 1324 output of the synthesizer 1326 to produce a first intermediate signal 1338 and an aliased first intermediate signal 1410, as shown in FIG. 14. A first filter 1810 substantially rejects the aliased first intermediate signal 1410 (after it has been amplified by amplifier 1812).

A first down-converter 1340 uses a mixer 1706 to mix the first intermediate signal 1338 with the signal produced by the second local oscillator 1318 to produce a second intermediate signal 1342 and an aliased second intermediate signal 1412. A second filter 1708 substantially rejects the aliased second intermediate signal 1412 (after it is amplified by amplifier 1710).

A second down-converter 1344 uses a mixer 1616 to mix the second intermediate signal 1342 (after it is amplified by amplifier 1618) with the signal produced by the first local oscillator 1312 to produce the analog IF receive signal 1014 and an aliased analog IF receive signal (not shown). A third filter 1620 substantially rejects the aliased analog IF receive signal. An variable-gain amplifier 1622 between the mixer 1616 and the third filter 1620 allows the DSP to control the receive gain using gain control signals 1624. A transformer 1626 isolates the mixer 1616 from the amplifier 1624. An amplifier 1628 amplifies the output of the third filter 1620 and a transformer 1630 isolates the output of the amplifier 1628 from the output 1014.

In a preferred embodiment, the second local oscillator, shown in detail in FIG. 17, is a phase locked loop including a phase locked loop (PLL) frequency synthesizer 1712. In a preferred embodiment, PLL frequency synthesizer 1712 is a MC145202 manufactured by Motorola.

The PLL frequency synthesizer 1712 has an SDI input, a SCLK input and an SLD input from the DSP 1022. The SDI input is the serial data line from the DSP 1022 that provides the configuration data for the PLL frequency synthesizer 1712. Through the configuration data transferred through the SDI input, the DSP 1022 can specify the frequency at which the phase locked loop 1318 is to operate. In the preferred embodiment, the SDI signal is also used to transfer data into the local oscillator 1326, as discussed below.

The SCLK is used to clock the transfer of serial data into the PLL frequency synthesizer 1712. In the preferred embodiment, the SCLK signal is also used to clock the transfer of data into the LO, as described below. The SLD signal is activated when the SDI data is intended for the PLL frequency synthesizer 1712.

The PLL frequency synthesizer 1712 provides a loop error signal 1716 as an input to the voltage controlled oscillator ("VCO") 1714. The frequency of the output 1718 of the VCO 1714 varies with the loop error signal 1716. The VCO output is amplified by amplifier 1720 and provided as the output of local oscillator 1318 through amplifiers 1722 and 1724. The output of amplifier 1720 is frequency divided by divider 1726 to produce an input to the PLL frequency synthesizer 1712, thereby closing the phase locked loop.

In other embodiments, the phase locked loop 1318 is replaced by other apparatus for generating a stable frequency signal, such as a crystal.

The local oscillator 1326, shown in more detail in FIG. 18, includes an LO synthesizer 1814, which generates the stepped frequency signal 1324. Amplifiers 1816 and 1818 amplify the stepped frequency signal 1324 for use by the down converter 1322 and the up converter 1336.

The LO synthesizer 1814 is controlled by the DSP using control lines 1820 and produces a calibration signal PN 1822, which is used by the DSP to calibrate the LO.

Figure 20:
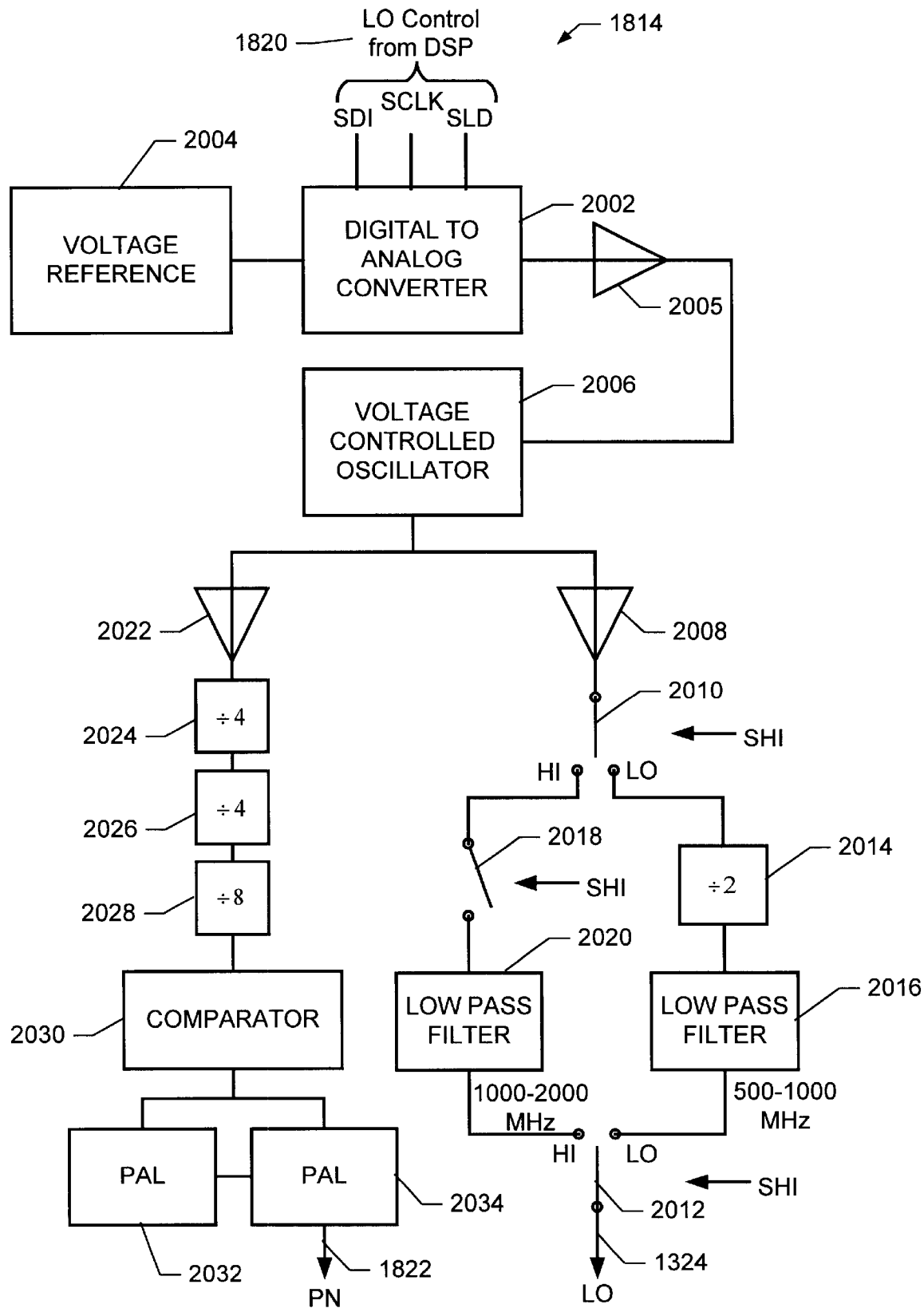
FIG. 20 is a block diagram of a local oscillator.

The LO synthesizer 1814, illustrated in detail in FIG. 20, includes a digital to analog converter (DAC) 2002 which is provided a voltage reference 2004. The level of the analog output of the DAC 2002 is determined by the SDI, SCLK and SLD inputs from the DSP. These signals were described above in the description of the phase locked loop 1318. When the SLD signal enables the DAC 2002, the SCLK signal clocks data in the SDI signal into the DAC 2002. The data clocked into the DAC determines the level of its output.

The DAC output is amplified by an amplifier 2005 and used to drive a voltage controlled oscillator (VCO) 2006. Thus, by selecting the data to store in the DAC 2002, the DSP 1022 can control the frequency of the output of the VCO 2006. In a preferred embodiment, the DSP 1022 controls the frequency of the output of the VCO 2006 to vary in steps, as shown in FIG. 15, from 1000 to 2000 MHz. An amplifier 2008 amplifies the output of the VCO 2006.

The system generates the entire desired range of frequencies, which, in a preferred embodiment is from 500 to 2000 MHz, by using a series of switches. To generate the stepped frequency signal over the range from 500 to 1000 MHz, the DSP unasserts the SHI signal which causes an input switch 2010 to switch to its "lo" position and an output switch 2012 to switch to its "lo" position. This configuration of switches causes the amplified output of the VCO 2006 to be routed to a frequency divider 2104, which divides the frequency of the signal by two. The result is filtered by low pass filter 2016 and provided as the stepped frequency signal 1324.

The DSP 1022 can generate the higher range of frequencies (e.g., from 1000 to 2000 MHz) by asserting the SHI signal, which causes the input switch 2010 and the output switch 2012 to switch to their respective "HI" positions. Similarly, switch 2018 is also closed allowing the amplified output of the VCO 2006 to be filtered by a low pass filter and provided as the stepped frequency signal 1324.

The output of the VCO 2006 is also used to generate a calibration signal PN for use by the DSP 1022. To accomplish this, the output of the VCO 2006 is amplified by amplifier 2022 and its frequency is divided by 64 by using a series of dividers 2024, 2026, and 2028. A comparator 2030 squares the edges of the divided signal. Two PALs 2032 and 2034 provide a logic interface between the divided signal and the DSP 1022.

Figure 21:
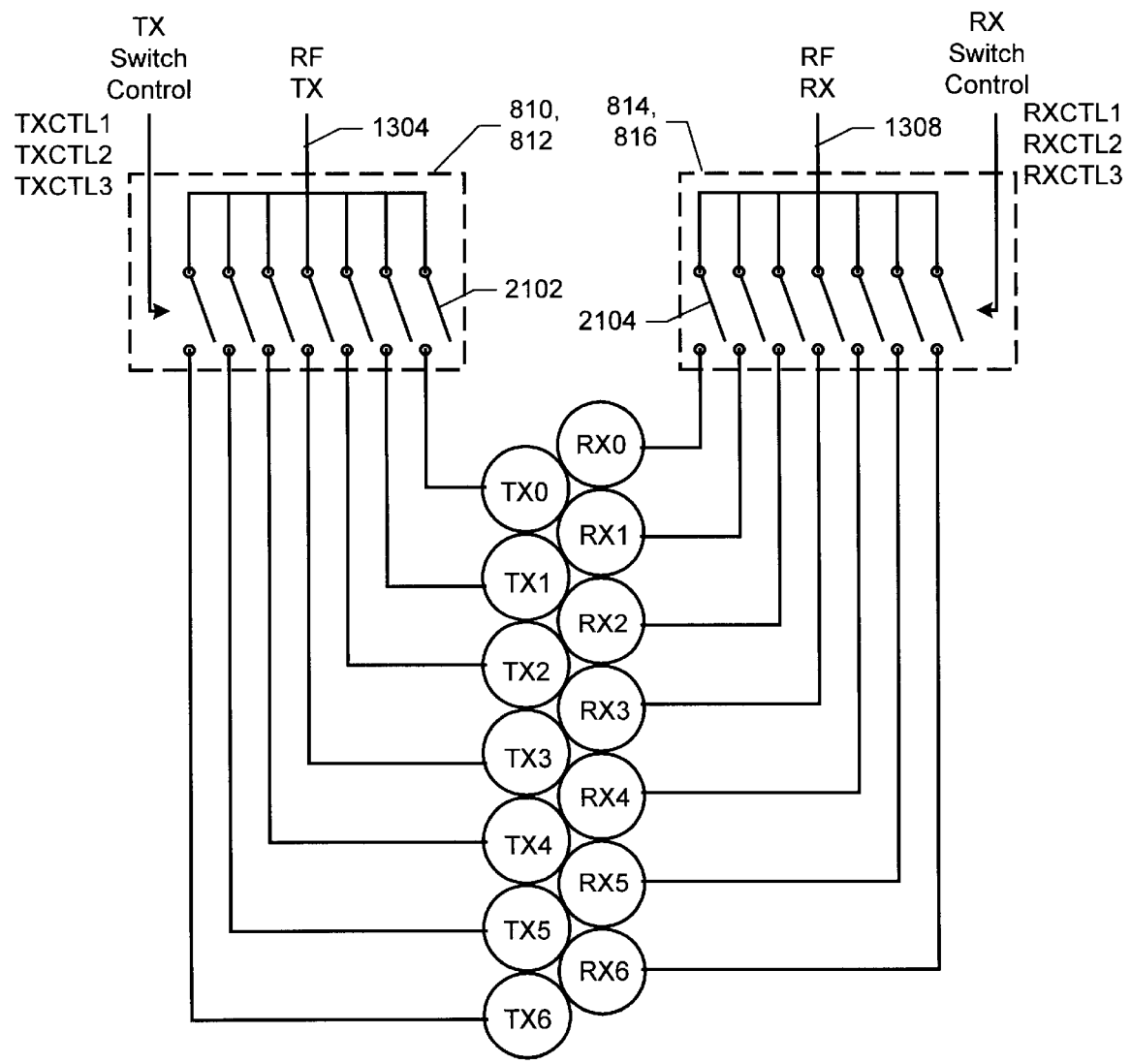
FIG. 21 is a block diagram of the transmit switch and the receive switch.

The transmit switch 810, 812, illustrated in FIG. 21, includes seven single-pole, single-throw switches 2102 with their common poles wired in parallel and connected to the stepped-frequency transmit signal 1304. The other pole of each switch is connected to one of the transmit antennas. Therefore, when one of the switches 2102 is actuated, the stepped frequency transmit signal 1304 is connected to a respective transmit antenna.

The selection of which of the switches 2102 to close is controlled by the DSP 1022 through the transmitter switch control lines, which include control lines TXCTL1, TXCTL2, and TXCTL3. The binary combination of these control lines determine which of the transmitter switches 2102 will close.

The receiver switch 814, 816 also includes seven single-pole, single-throw switches 2104 with their common poles wired in parallel and connected to the stepped frequency received signal 1308. The other pole of each switch is connected to one of the received antennas in the receive array. Therefore, when one of the switches 2104 is closed, the corresponding receive antenna provides the stepped frequency received signal 1308.

The determination of which of the switches 2104 is to close is controlled by the DSP 1022 through the receive switch control signals, which includes three switch control signals RXCTL1, RXCTL2, and RXCTL3. The switch 2104 that is closed depends on the binary combination of those three control signals.

As discussed above, in a preferred embodiment, the system records data at 13 locations spaced 2.76 inches apart for each antenna array 114, 116. Software in the computer 108 fuses this data into a grid of rows and columns of data, where each row includes data taken from 26 locations spaced 1.38 inches apart. The columns represent the data taken at different locations along the direction of cart movement 306 (see FIG. 3).

Figure 22:
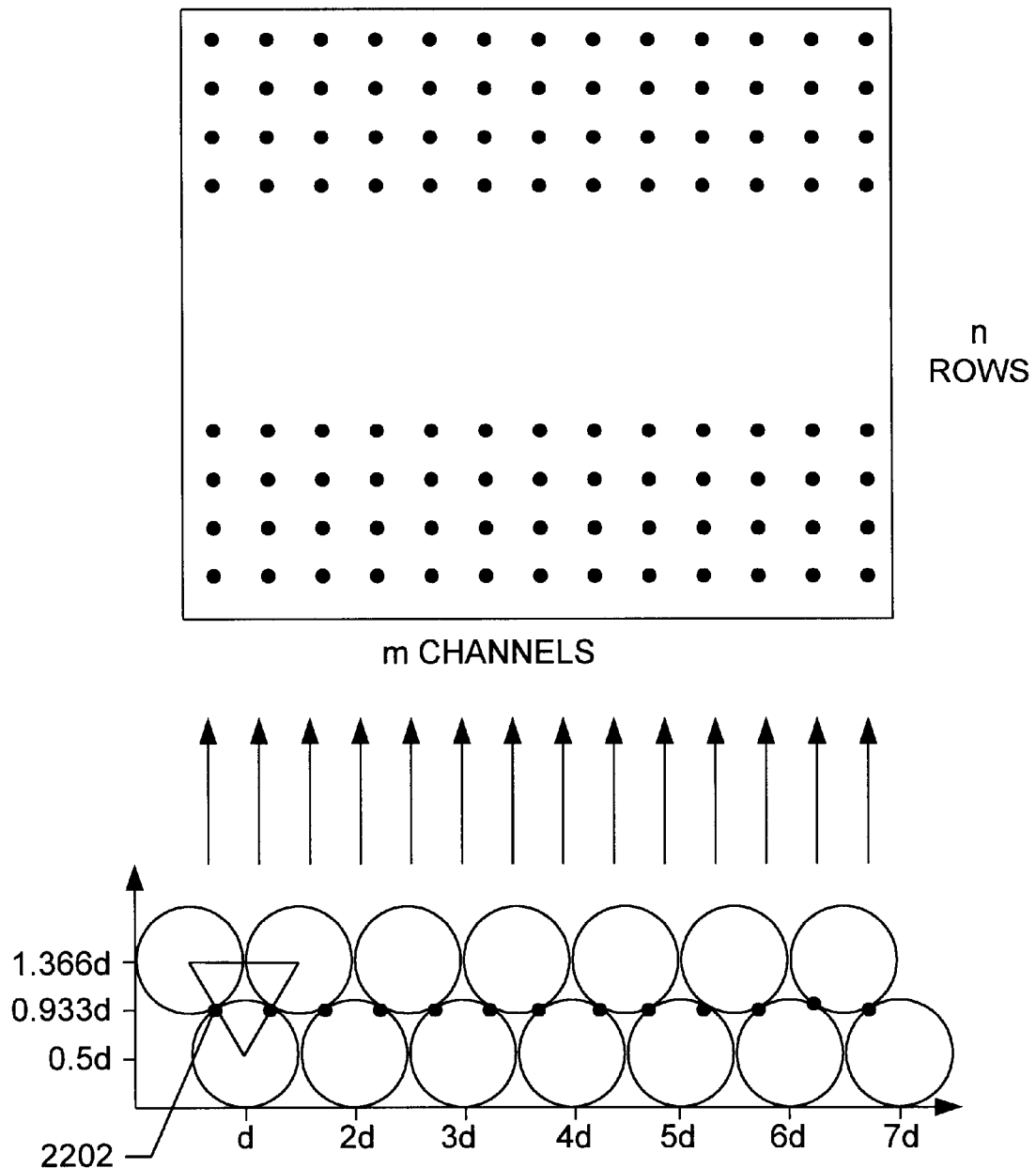
FIG. 22 illustrates the grid of points collected by movement of the ground penetrating radar system along the ground.

In general, the system records stepped-frequency radar data over an n row by m channel grid, as illustrated in FIG. 22, with the location of the individual points in the grid being expressed as $(x_m, y_n)$ where $x_m = m \cdot dx$, $y_n = n \cdot dy$, where dx is the space between points in the cross track direction (see FIG. 3), m is an index in the cross track direction, dy is the sampling interval in the in track direction, and n is an index in the in track direction. In the preferred embodiment, dx is 1.38 inches and dy is operator selectable, and is preferably selected to be 1.38 inches, producing a rectangular array. In the preferred embodiment, m varies from 1 to 26 and n varies from 1 to N, where N is the total number of scans that the system performs.

In the preferred embodiment, data channels m=1,3,5, . . . ,25 are recorded using the first antenna array 114 and data channels m=2,4,6, . . . ,26 are recorded using the second antenna array 116. The cross track resolution when both antenna arrays are used is 1.38". Individual images can be formed using either the first antenna array 114 alone or the second antenna array alone. For individual images of these two types, the cross track resolution is 2.76".

Figure 23:
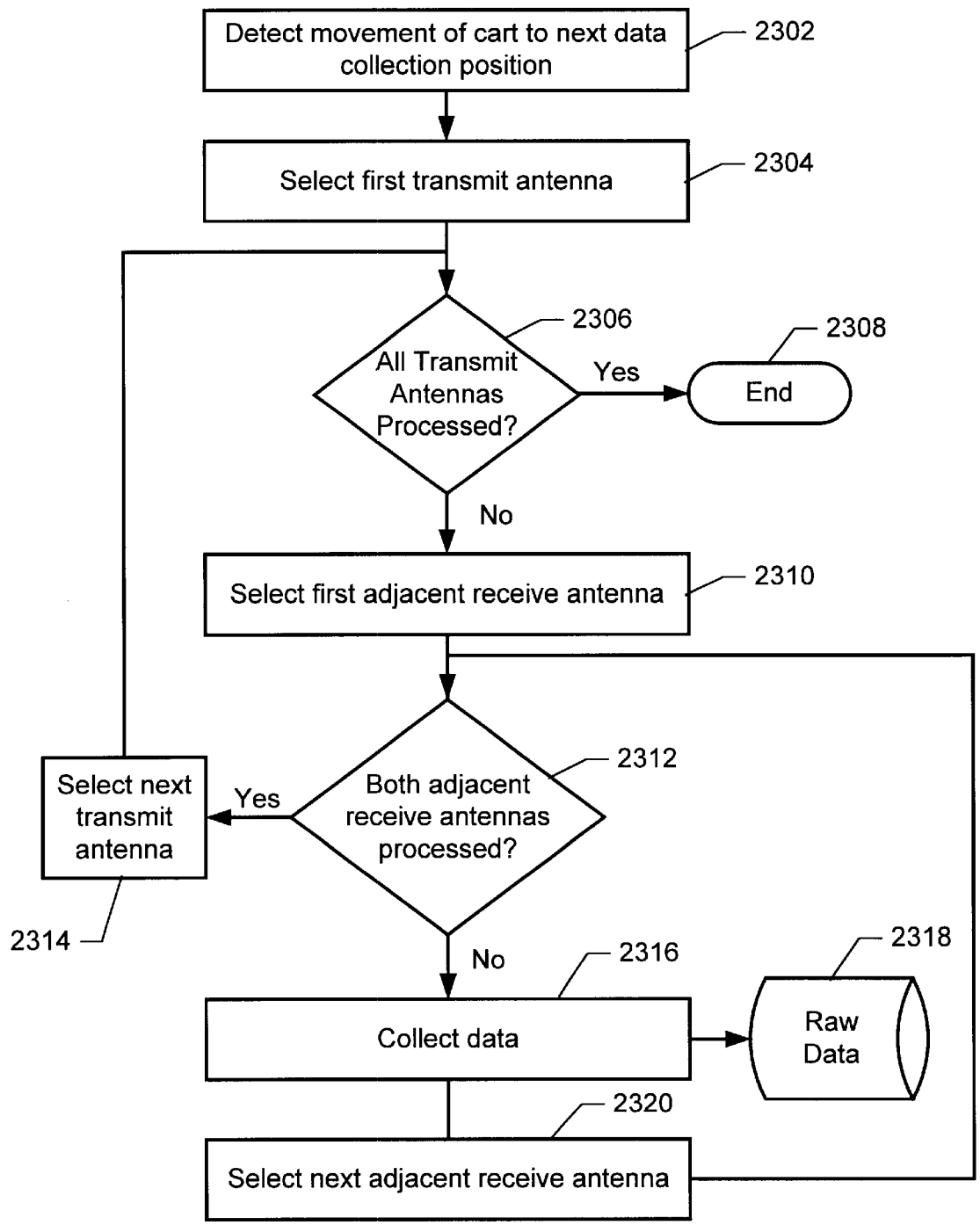
FIG. 23 is a block diagram of the raw data collection processing.

The processing that the system performs includes collecting raw data and analyzing the raw data. Collecting the raw data, illustrated in FIG. 23, includes detecting movement of the cart to the next data collection position (block 2302). The system accomplishes this by monitoring the movement detector 202. The system then selects one of the transmit antennas (block 2304) and determines if all of the transmit antennas have been processed (block 2306). If they have, the process terminates (block 2308) until the cart moves to the next data collection position (block 2302).

If the all of the transmit antennas have not yet been processed, the system selects a receive antenna adjacent to the selected transmit antenna (block 2310). The system then determines if both of the receive antennas adjacent to the selected transmit antenna have been processed (block 2312). If they have, the system selects the next transmit antenna (block 2314) and returns to the beginning of the loop (to block 2306).

Otherwise, the system collects data using the selected transmit antenna and the selected receive antenna (block 2316) to produce raw data 2318, the raw data collected at spatial location $(x_m, y_n)$ being denoted by $\Psi_{mnp}$ where the indices m, n are used to denote position in the grid of spatial locations where data has been collected, and p is an index ranging from 1 to P corresponding to the frequency $f_p$ at which the data was collected. The frequency step of the system is $df = (f_P - f_1)/(P-1)$. The unambiguous range of the radar is $c/(2 \cdot df)$ where c denotes light speed in air. Each of the data points $\Psi_{mnp}$ is a complex number. In a preferred embodiment, a user may specify $f_1$ and $f_p$.

Once the data has been collected for the selected transmit antenna and the selected receive antenna, the system selects the next receive antenna (block 2320) and returns to the beginning of the data collection loop (block 2312).

Figure 24:
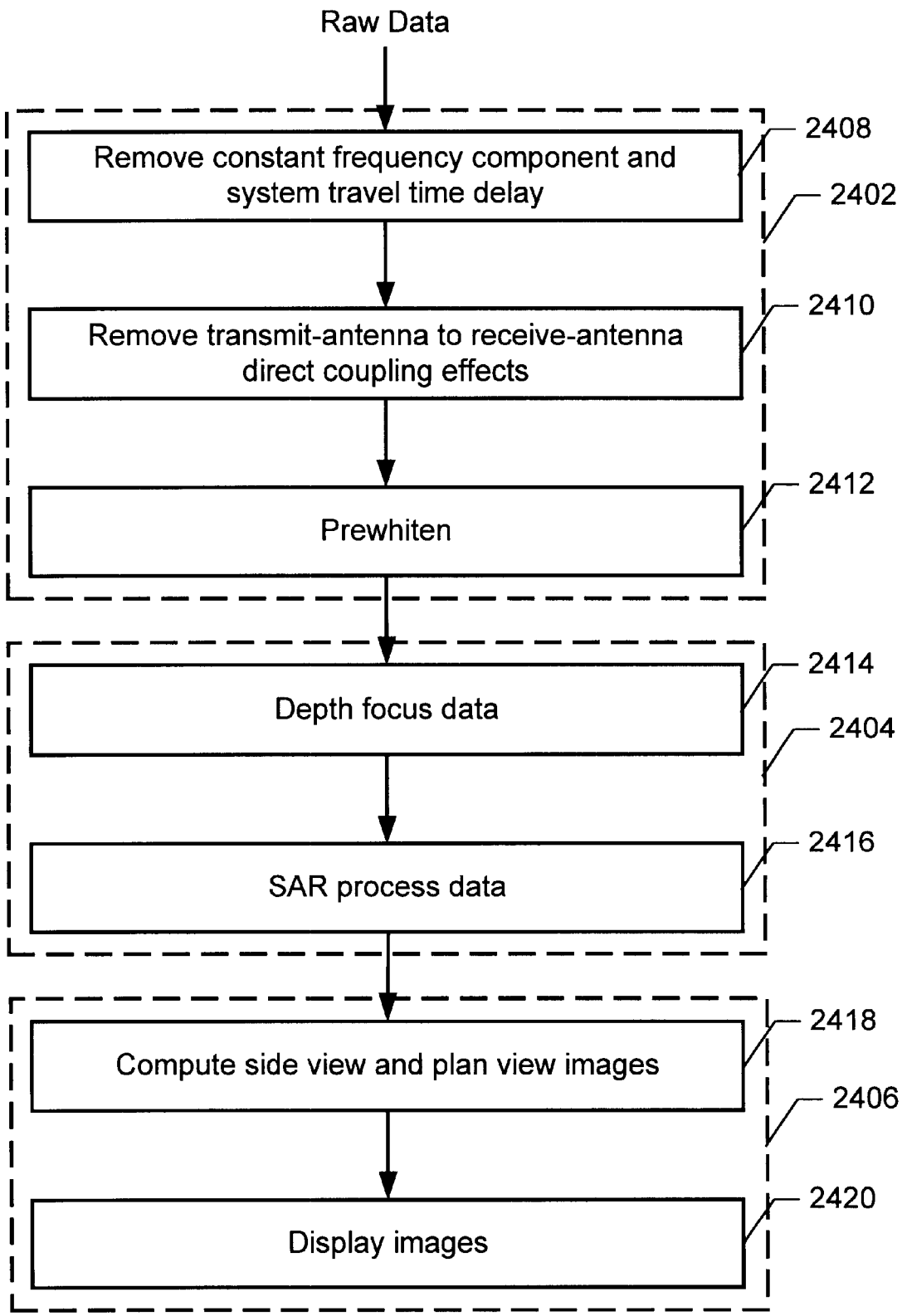
FIG. 24 is a block diagram of the raw data analysis processing.

Analyzing the raw data 2318, as illustrated in FIG. 24, includes preconditioning the raw data 2318 to produce preconditioned data (block 2402), analyzing the preconditioned data (block 2404) and displaying images of the analyzed data (block 2406).

Preconditioning the raw data to produce preconditioned data includes removing a constant frequency component and a system travel time delay (block 2408), removing a transmit-antenna to receive-antenna coupling effect (block 2410) and prewhitening (block 2412) for each spatial location of the raw data.

In the preferred embodiment, removing the constant frequency component and the system travel time delay (block 2408) includes applying the following equation:

$$\hat{\Psi}_{mnp} = \left(\Psi_{mnp} - \frac{1}{P}\sum_{p=1}^{P} \Psi_{mnp}\right) \exp(i \cdot 2\pi \cdot f_p \cdot \tau).$$

Removing the transmit-antenna to receive-antenna coupling effect (block 2410) is performed to minimize the effects of ground bounce. In the preferred embodiment, this is accomplished by using a spatial high pass filter which acts in the in track direction. This changes the system from an absolute return system to a relative return system.

There are several techniques for implementing the spatial high pass filter. They include single row differencing, averaging techniques, Fourier techniques, and digital filtering. Single row differencing, which is the simplest method, includes applying the following equation:

$$\Psi_{mnp} = \hat{\Psi}_{mnp} - \hat{\Psi}_{m\bar{n}p}$$

where $\hat{\Psi}_{m\bar{n}p}$ is an in track reference scan. In a preferred embodiment, the user selects the in track reference scan.

Another technique, called average differencing, applies the following equation:

$$\Psi_{mnp} = \hat{\Psi}_{mnp} - \frac{1}{N_2 - N_1 + 1} \cdot \sum_{n=N_1}^{N_2} \hat{\Psi}_{mnp}$$

where $N_1$ and $N_2$ define a region to be imaged.

A generalized technique for removing the transmit-antenna to receive-antenna coupling effect comprises applying the following equation:

$$\Psi_{mnp} = \sum_{q=-Q}^{Q} a_q \cdot \hat{\Psi}_{m,n+q,p}$$

where $a_q$ are digital filter coefficients chosen to reject low frequency spatial energy.

Removing the transmit-antenna to receive-antenna coupling effect may be accomplished by performing spatial filtering in the cross track direction by applying the following equation:

$$\Psi_{mnp} = \hat{\Psi}_{mnp} - \hat{\Psi}_{\tilde{m}np}$$

where $\hat{\Psi}_{\tilde{m}np}$ is a cross line reference scan.

In the preferred embodiment, prewhitening (block 2442) includes applying the following equation:

$$\gamma_{mnp} = b_p \cdot \Psi_{mnp}$$

where $b_p$ are frequency dependent weights.

In the preferred embodiment, analyzing the preconditioned data (block 2404) includes depth focusing (block 2414) and synthetic aperture radar (SAR) processing (block 2416).

Figure 25:
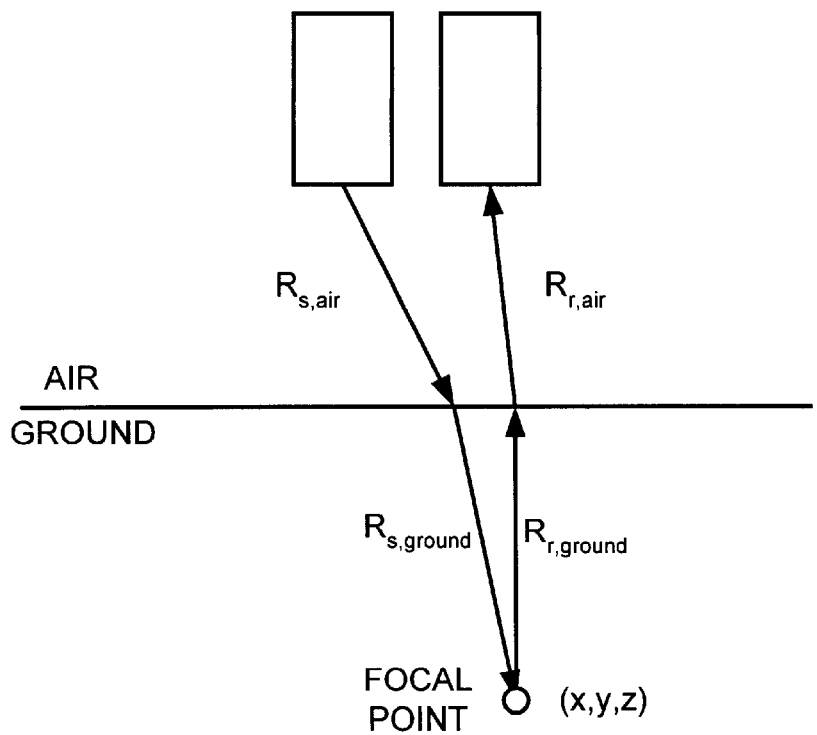
FIG. 25 illustrates the geometry of depth focusing.

Depth focusing (block 2414) includes analyzing the preprocessed data to resolve a target in depth. The geometry of depth focusing (block 2414) is illustrated in FIG. 25. To accomplish depth focusing (block 2414) the system measures the transfer function of the ground as a function of frequency. The Fourier transform of the transfer function yields the desired depth response function. The relevant equations are:

$$I(x, y, z) = \int_{f_{min}}^{f_{max}} \Psi(f) \exp(i 2\pi f \tau) df$$

$$= \Delta f \sum_{p=1}^{N_f} \Psi_p \exp(i 2\pi f_p \tau)$$

where $I(x,y,z)$ is the complex image amplitude and the travel time from the source to the focal point and back again is as follows:

$$\tau(x, y, z) = \frac{R_{s,air} + R_{r,air}}{c_{air}} + \frac{R_{s,ground} + R_{r,ground}}{c_{ground}}$$

Figure 26:
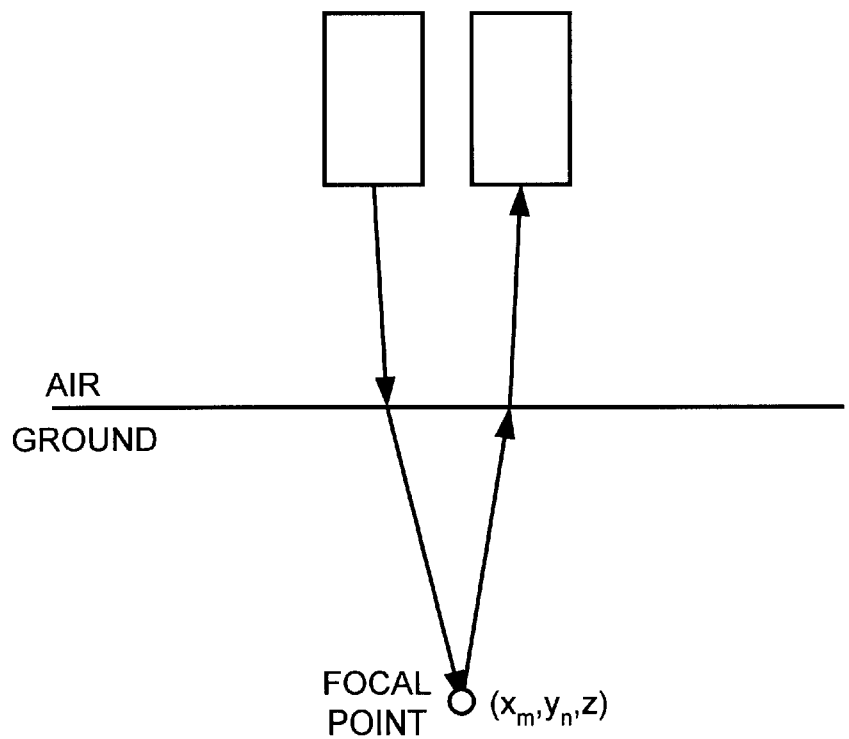
FIG. 26 illustrates the geometry of collection of points midway between a transmit antenna and a receive antenna.

In the preferred embodiment, depth focusing is performed at points, e.g. point 2202 in FIG. 22, directly beneath the points of tangency between the source and receive antennas, as illustrated in FIG. 26. The complex amplitude of the image is formed using the following equation:

$$I(x_m, y_n, z) = \Delta f \sum_{p=1}^{N_f} \Psi_{mnp} \exp[i 2\pi f_p \tau_{mn}(x_m, y_n, z)]$$

Figure 27:
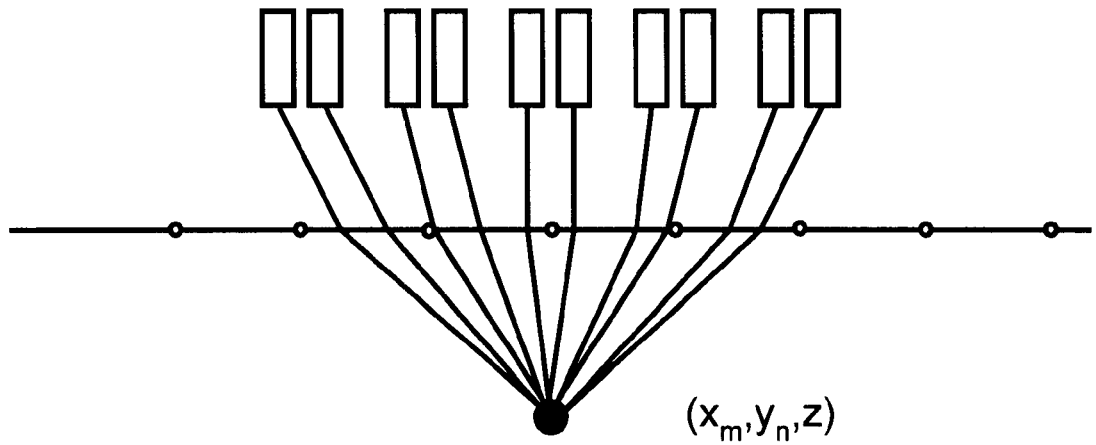
FIG. 27 illustrates the geometry of synthetic aperture radar processing.
Figure 27:
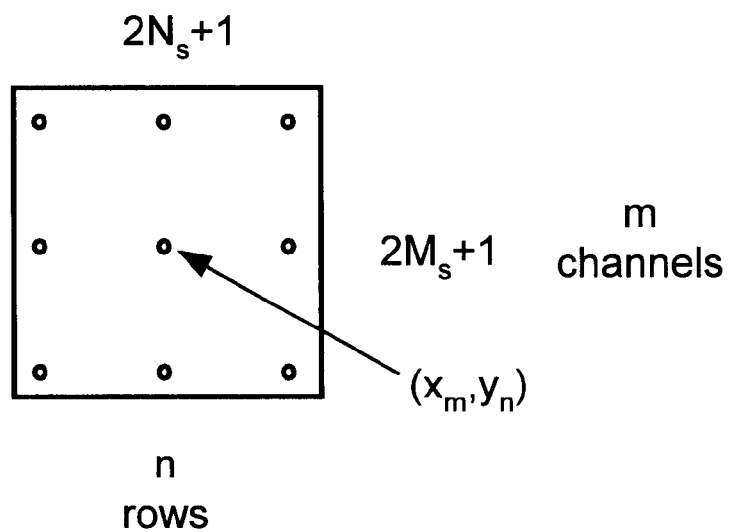

SAR processing (block 2416), which can enhance the images eventually produced from the raw data, is accomplished by combining data from multiple locations using nearfield, delay and sum beamforming, as illustrated in FIG. 27. The equation for SAR processing is shown below:

$$I_{\hat{n}}(x_m, y_n, z) = \Delta f \sum_{u=-U}^{U} \sum_{v=-V}^{V} \sum_{p=P_1}^{P_2} \Delta \Psi_{m+u,n+v,p,\hat{n}}$$

$$\exp(i \cdot 2\pi \cdot f_p \cdot \tau_{m+u,n+v}(x_m, y_n, z))$$

The phase weights in this equation do not depend on absolute sensor position and, in the preferred embodiment, they are precomputed and reused which greatly reduces the time required to perform SAR processing.

In the preferred embodiment, the size of the SAR array is $(2M_s+1)(2N_s+1)$. For $M_s=1$ and $N_s=1$, the array will contain 9 points.

SAR processing (block 2416) is an optional procedure which can be selected by the user to enhance the images produced by the system.

Depth focusing (block 2414) and SAR processing (block 2416) can be accomplished in one step by applying the following equation:

$$I_{mnp} = \frac{1}{(2U+1)(2V+1)P} \cdot \sum_{u=-U}^{U} \sum_{v=-V}^{V} \sum_{p=P_1}^{P_2} \gamma_{m+u,n+v,p} \exp(i \cdot 2\pi \cdot f_p \cdot \tau_{uvw})$$

where $I_{mnw}$ is the complex image value at spatial location $(x_{F,m}, y_{F,n}, z_w)$;

U is the SAR array size in the cross-track direction;

V is SAR array size in the along track direction;

$(f_{P_1}, f_{P_2})$ is the frequency processing band;

$\tau_{uvw}$ is the travel time from source (u, v) in the SAR array down to a focal point at depth $z_w$ and back up to receiver (u, v) in the SAR array;

$$x_{F,m} = \frac{3d}{4} + \frac{(m-1)d}{4};$$

$y_{F,n} = 0.933013d + (n-1)dy$, preferably;

d=5.52 inches, preferably; and dy=scan spacing.

The system can operate with the transmit antennas and the receive antennas in contact with the ground. In that case:

$$\tau_{uvw} = \frac{1}{c_g} [(x_{s,u} - x_{r,u})^2 + (y_{s,v} - y_{r,v})^2 + z_w^2]$$

where $(x_{s,u}, y_{s,v})$ and $(x_{r,u}, y_{r,v})$ are the location of the transmit and receive antennas and $c_g$ is the speed of light in the ground.

Figure 28:
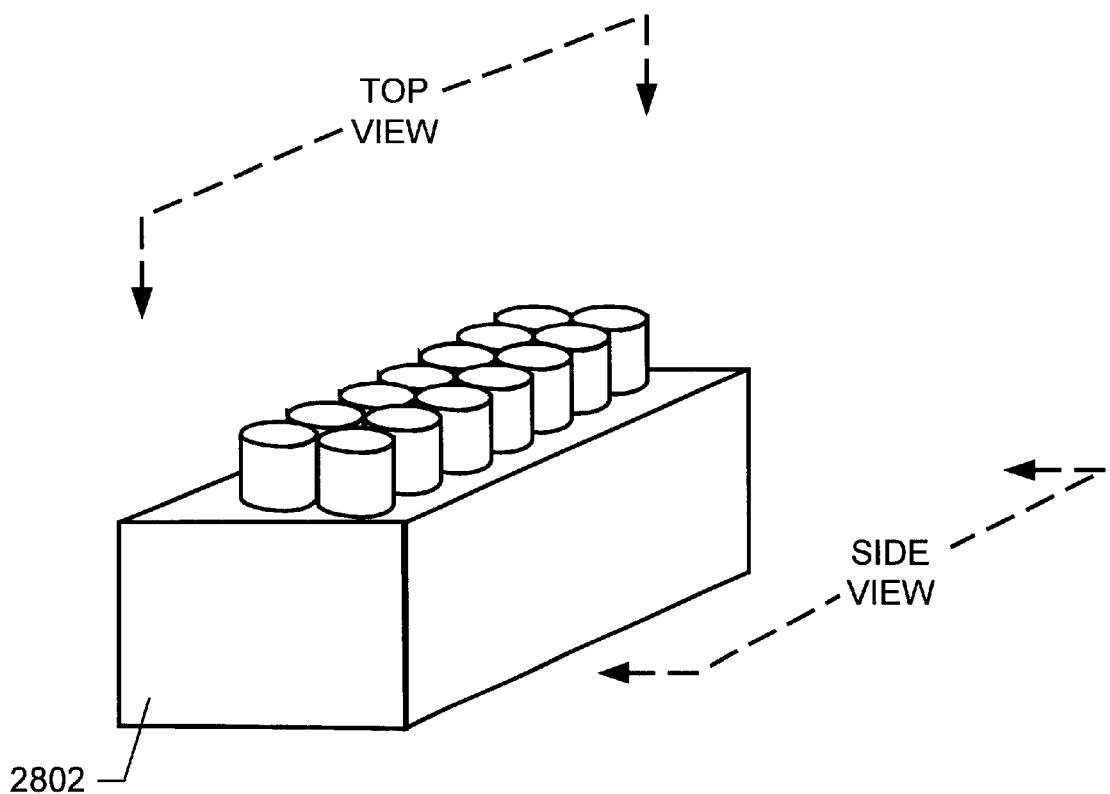
FIG. 28 illustrates a volume of collected data and a top view and a side view of that data.

The preprocessing of the data (block 2402) and the analysis of the preprocessed data (block 2404) produces a block of data representing a three dimensional volume 2802 as illustrated in FIG. 28. The invention allows the display of a plan view of the analyzed data and a side view of the analyzed data.

Displaying images of the analyzed data (block 2406) includes computing a plan view image of the analyzed data, computing a side view image of the analyzed data (block 2418) and displaying the plan view image and the side view image (block 2420).

In the preferred embodiment, computing the plan view image of the analyzed data includes applying the following equation:

$$\text{PlanView}_{mn} = \max_w |I_{mnw}|^2$$

where $\max_w$ is the maximum value across all w (depths).

In the preferred embodiment, computing the side view image of the analyzed data includes applying the following equation:

$$\text{SideView}_{nw} = \max_m |I_{mnw}|^2$$

where $\max_w$ is the maximum value across all w (depths).

In other embodiments, the plan view image and the side view image are computed using other rendering techniques such as averaging or displaying only image values that fall within defined ranges. Any method or technique for presenting a side view and a plan view fall within the scope of the invention.

Figure 29:
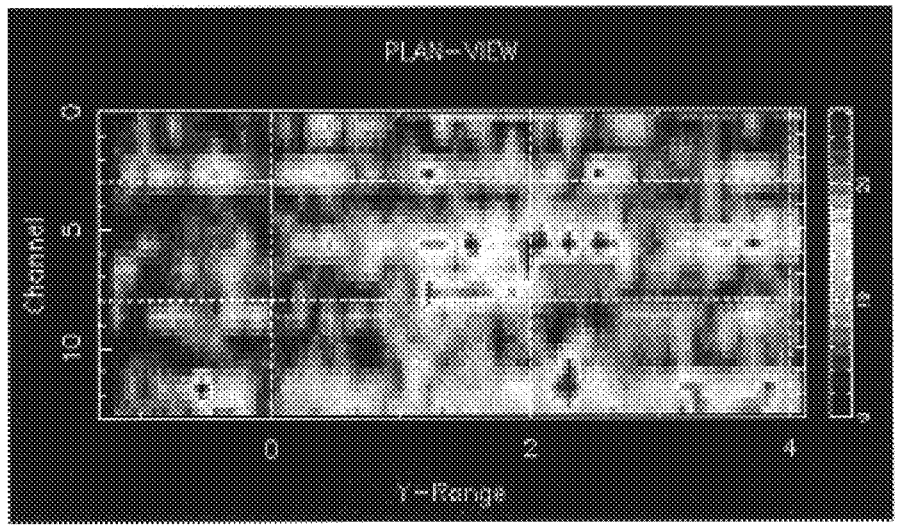
FIG. 29 illustrates images of data prior to processing.
Figure 29:
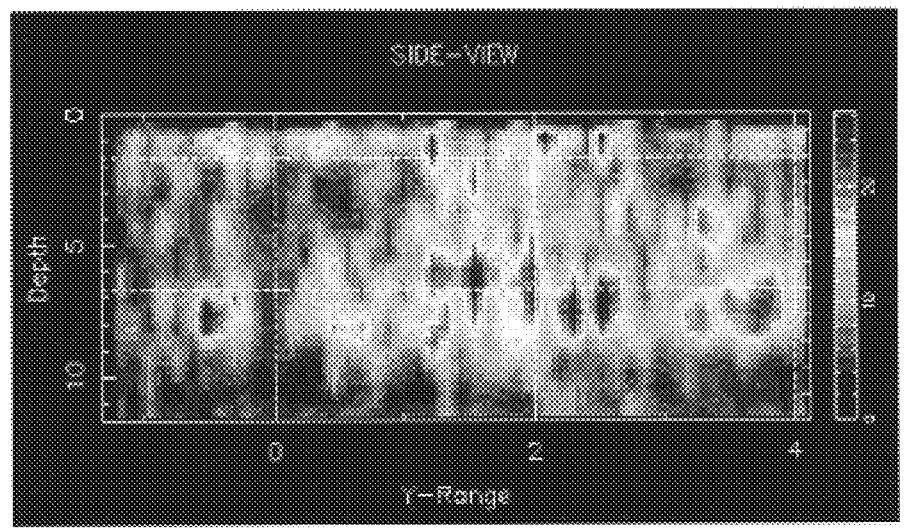
Figure 30:
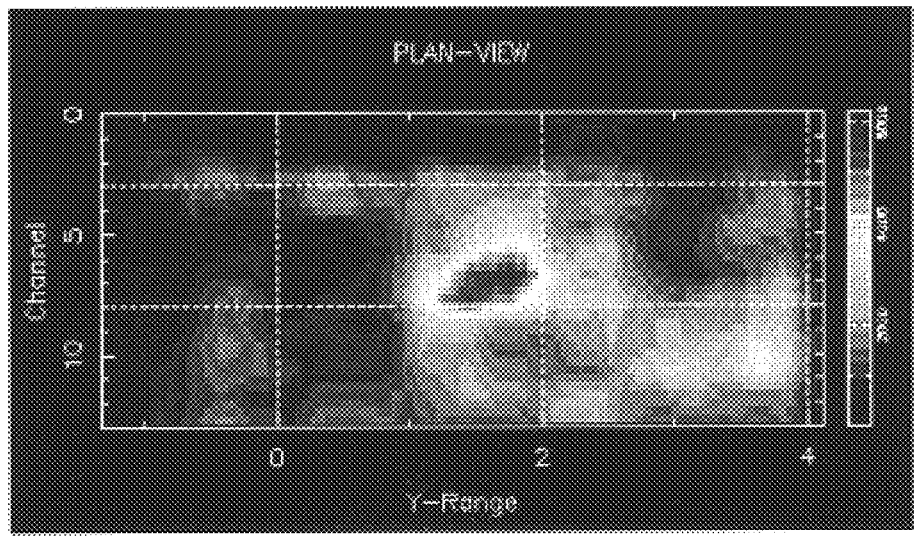
FIG. 30 illustrates images of data after processing.
Figure 30:
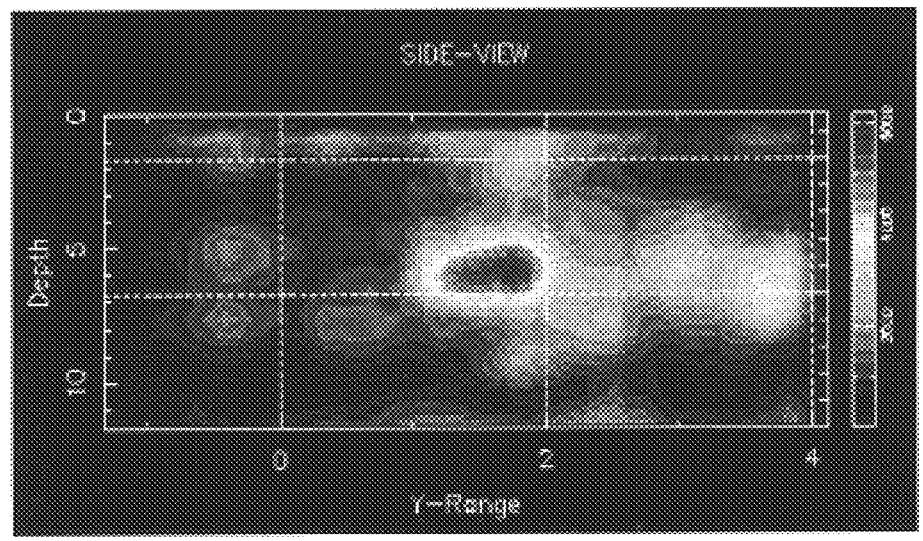

The results of removing the transmit-antenna to receive-antenna coupling effects (block 2410) and SAR processing (block 2416) are illustrated in FIGS. 29 and 30. FIG. 29 shows the data without removing the transmit-antenna to receive-antenna coupling effects (block 2410) and SAR processing (block 2416). FIG. 30 shows the same data after difference referencing using the first data row (block 2410) and after SAR processing (block 2416). A mine is visible at about channel 7 and Y-Range 1.5 in the plan view and at a depth of about 6 and a Y-Range of about 1.5 in the side view.

Figure 31:
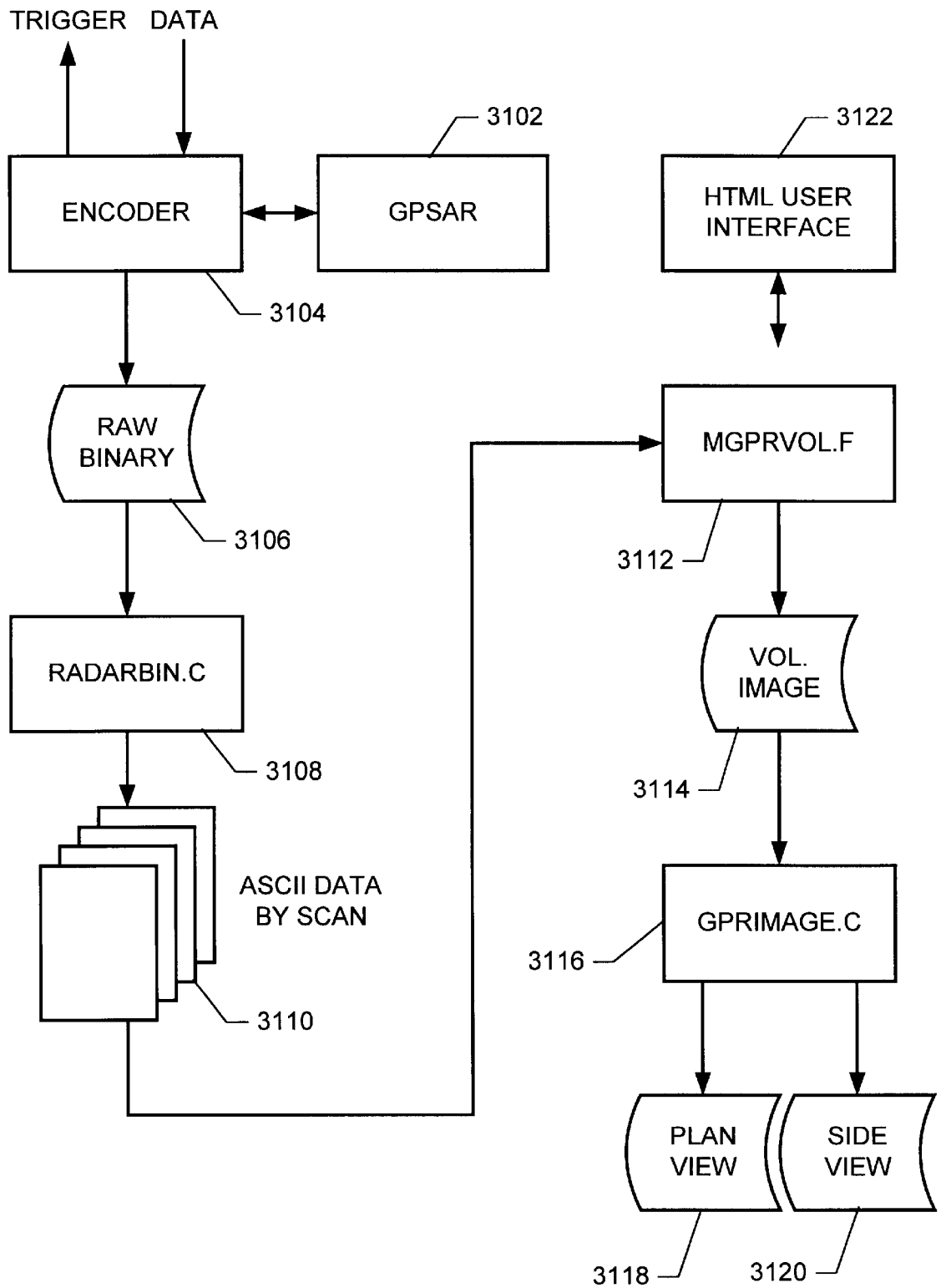
FIG. 31 illustrates a physical block diagram of the processing performed in the ground penetrating radar system.

A physical description of a preferred embodiment of the processing performed by the ground penetrating radar is illustrated in FIG. 31.

The GPSAR program 3102 resides on the computer 108 and provides user control of the ground penetrating radar data acquisition. It accepts a file name, dy (the in track distance between grid points) and array offset (the distance the two antenna arrays are offset from each other).

The ENCODER program 3104 resides on the computer 108 and triggers the system to take data based on a signal from the movement detector 202. It also receives the scan data and stores it as raw binary data 3106.

The RADARBIN.C program 3108 resides on the computer 108 and converts the raw binary data 3106 to ASCII data sorted by scan 3110.

The MGPRVOL.F program 3112 resides on the computer 108 and computes a volumetric image 3114 from the ASCII data 3110.

The GPRIMAGE.C program 3116 renders a plan view 3118 and a side view 3120 from the volumetric image 3114.

The HTML User Interface 3122 is a web browser such as Netscape Navigator or Microsoft Explorer.

The programs stored in the memory 908 for the processor 906 in the digital modules control the configuration of their respective components and accept as inputs the start frequency, stop frequency, number of frequency steps in the scan, and the dwell time at each scan step. These programs also provide a local area network, e.g., ETHERNET, interface to the computer 108 and serve up a web page that can be accessed from the computer 108 through the HTML user interface 3122. These programs also collect data from the DSP 1022.

The programs stored in the program memory 1026 for the DSP 1022 control the digital module 802, 804, the RF module 806, 808, and the TX and RX switches 810, 812, 814, and 816.

While some of the components have been described as being implemented in hardware and others in software or firmware, it will be apparent to persons of ordinary skill in the art that some of the hardware portions could be implemented in software or firmware and that some of the software or firmware portions could be implemented in hardware. The software or firmware portions of the system may be written in machine language, assembly language or a higher order language, including such languages as C++, FORTRAN, JAVA or PEARL.

Although several specific embodiments of the invention have been described and illustrated, the invention is not to be limited to the specific forms or arrangements of the parts steps so described and illustrated. The invention is limited only by the claims.

What is claimed is:

1. A ground penetrating radar system comprising
   a cart that moves over ground;
   a computer mechanically coupled to the cart;
   a radar electronics module mechanically coupled to the cart and electrically coupled to the computer;
   a first antenna array mechanically coupled to the cart, electrically coupled to the radar electronics module, and oriented to radiate into the ground and receive radiation from the ground;
   a second antenna array mechanically coupled to the cart, electrically coupled to the radar electronics module, and oriented to radiate into the ground and receive radiation from the ground;
   a movement detector coupled to the computer, wherein the movement detector detects movement of the cart over the ground; and
   the computer triggers the radar electronics module when the computer detects that the cart has moved a predefined distance over the ground.

2. The ground penetrating radar system of claim 1 wherein
   the radar electronics module comprises
     a first radar electronics module electrically coupled to the first antenna array; and
     a second radar electronics module electrically coupled to the second antenna array.

3. The ground penetrating radar system of claim 1 wherein
   the first antenna array is configured to radiate and receive radiation from a first series of points along a first set of curves parallel to the direction of movement of the cart;
   the second antenna array is configured to radiate and receive radiation from a second series of points along a second set of curves parallel to the direction of movement of the cart; and
   the first set of curves is interleaved with the second set of curves.

4. A ground penetrating radar system comprising
   a first bank of receive antennas arranged along a first axis;
   a first bank of transmit antennas arranged along a second axis approximately parallel to the first axis and horizontally displaced from the first axis;
   a second bank of receive antennas arranged along a third axis approximately parallel to the first axis and horizontally displaced from the first axis;

a second bank of transmit antennas arranged along a fourth axis approximately parallel to the first axis and horizontally displaced from the first axis;

a first radar electronics module coupled to the first bank of transmit antennas and the first bank of receive antennas;

a second radar electronics module coupled to the second bank of transmit antennas and the second bank of receive antennas; wherein the transmit antennas in the first bank of transmit antennas are interleaved with the receive antennas in the first bank of receive antennas;

the transmit antennas in the second bank of transmit antennas are interleaved with the receive antennas in the second bank of receive antennas; and the receive antennas in the first bank of transmit antennas are offset along the first axis from the receive antennas in the second bank of transmit antennas.

5. The ground penetrating radar system of claim 4 wherein
the first bank of transmit antennas is offset along the second axis with respect to the second bank of transmit antennas.

6. The ground penetrating radar system of claim 4 wherein
the banks of receive antennas alternate with the banks of transmit antennas.

7. The ground penetrating radar system of claim 4 wherein
each transmit antenna is adjacent to at least one receive antenna; and
each transmit antenna is oriented to minimize electromagnetic coupling to at least one of its adjacent receive antennas.

8. The ground penetrating radar system of claim 7 wherein
each transmit antenna comprises at least one spiral arm of conductive material;
each receive antenna comprises at least one spiral arm of conductive material; and
a tangent to the inside of the spiral arm at the edge of a transmit antenna is approximately perpendicular to a tangent to the inside of the spiral arm at the edge of a receive antenna adjacent to the transmit antenna.

9. The ground penetrating radar system of claim 8 wherein
each transmit antenna comprises two spiral arms of conductive material; and
each receive antenna comprises two spiral arms of conductive material.

10. The ground penetrating radar system of claim 4 wherein
the transmit antennas and the receive antennas have faces with centers;
two adjacent first bank receive antennas from the first bank of receive antennas and a first bank transmit antenna from the first bank of transmit antennas interleaved between the two adjacent first bank receive antennas are positioned such that lines between the centers of the faces of the two adjacent first bank receive antennas and the interleaved first bank transmit antenna form a first triangle having sides of approximately the same length;
two adjacent second bank receive antennas from the second bank of receive antennas and a second bank transmit antenna from the second bank of transmit antennas interleaved between the two adjacent second bank receive antennas are positioned such that lines between the centers of the faces of the two adjacent second bank receive antennas and the interleaved second bank transmit antenna form a second triangle having sides of approximately the same length;
a vertex of the first triangle is displaced in the direction of the first axis relative to a corresponding vertex of the second triangle by an amount approximately equal to one-half the distance from the center of one side of the first triangle to the center of another side of the first triangle.

11. The ground penetrating radar system of claim 10, wherein
the third axis is horizontally displaced from the first axis by an amount approximately equal to eight times the distance from the center of one side of the first triangle to the center of another side of the first triangle.

12. The ground penetrating radar system of claim 4 wherein
the transmit antennas are not in contact with the ground when in operation.

13. The ground penetrating radar system of claim 4 wherein
the receive antennas are not in contact with the ground when in operation.

14. A ground penetrating radar system comprising
a digital module comprising:
a direct digital synthesizer that generates a digital IF reference signal;
a digital to analog converter coupled to the direct digital synthesizer that converts the digital IF reference signal to an analog IF transmit signal;
an analog to digital converter that converts an analog IF receive signal to a digital IF receive signal;
a digital down converter that digitally mixes the digital IF receive signal with:
the digital IF reference signal to produce an in-phase product;
the digital IF reference signal shifted in phase by ninety degrees to produce a quadrature product;
an RF module coupled to the digital module comprising
an up-converter that converts the analog IF transmit signal into a transmit signal;
a down-converter that converts a receive signal into an analog IF receive signal;
a transmit antenna array coupled to the up-converter for radiating the transmit signal; and
a receive antenna array coupled to the down-converter for receiving the receive signal.

15. The ground penetrating radar system of claim 14 wherein
the transmit antenna array comprises a plurality of transmit antennas;
the receive antenna array comprises a plurality of receive antennas, and the system further comprises
a digital signal processor;
a transmit switch for applying the transmit signal to one of the plurality of transmit antennas, the transmit switch being controlled by the digital signal processor; and
a receiver switch for receiving the receive signal from one of the plurality of receive antennas, the receiver switch being controlled by the digital signal processor.

16. The ground penetrating radar system of claim 15 wherein
the digital signal processor controls the direct digital synthesizer, the digital down converter, the up-converter and the down-converter.

17. The ground penetrating radar system of claim 14 wherein
the transmit signal comprises a stepped-frequency transmit signal; and
the receive signal comprises a stepped-frequency receive signal.

18. The ground penetrating radar system of claim 14 further comprising
a computer coupled to a processor through an extensible network, the processor being configured to communicate with the digital signal processor.

19. The ground penetrating radar system of claim 14 wherein the extensible network is a local area network.

20. A ground penetrating radar system comprising
a digital module that generates an analog IF transmit signal and receives an analog IF receive signal;
an RF module comprising
a triple-heterodyne up-converter for converting an analog IF transmit signal into a stepped-frequency transmit signal; and
a triple-heterodyne frequency converter for converting a stepped-frequency receive signal into an analog IF receive signal;
a transmit antenna coupled to the up-converter for radiating the stepped-frequency transmit signal; and
a receive antenna coupled to the down-converter for receiving the stepped-frequency receive signal.

21. The ground penetrating radar system of claim 20 wherein the triple-heterodyne up-converter comprises
a first up-converter that mixes the analog IF transmit signal with a signal from a first local oscillator to produce a first intermediate signal and an aliased first intermediate signal;
a first filter coupled to the first up-converter for attenuating the aliased first intermediate signal;
a second up-converter coupled to the first filter that mixes the first intermediate signal with a signal from a second local oscillator to produce a second intermediate signal and an aliased second intermediate signal;
a second filter coupled to the second up-converter for attenuating the aliased second intermediate signal; and
a down-converter coupled to the second filter that mixes the second intermediate signal with a stepped frequency signal to produce the stepped-frequency transmit signal and an aliased stepped-frequency transmit signal; and
a third filter coupled to the down-converter for attenuating the aliased stepped-frequency transmit signal.

22. The ground penetrating radar system of claim 20 wherein the triple-heterodyne up converter comprises
an up-converter that mixes the stepped-frequency receive signal with a stepped-frequency signal to produce a first intermediate signal and an aliased first intermediate signal;
a first filter coupled to the first up-converter for attenuating the aliased first intermediate signal;
a first down-converter coupled to the first filter that mixes the first intermediate signal with a signal from a first local oscillator to produce a second intermediate signal and an aliased second intermediate signal;
a second filter coupled to the first down-converter for attenuating the aliased second intermediate signal;
a second down-converter coupled to the second filter that mixes the second intermediate signal with a second local oscillator to produce the analog IF receive signal and an aliased analog IF receive signal;
a third filter coupled to the second down-converter for attenuating the aliased analog IF receive signal.

23. A ground penetrating radar system comprising
a transmitter;
a receiver
an array of transmit antennas;
an array of receive antennas interleaved with the array of transmit antennas;
a transmit switch that selectively couples the transmitter to one of the array of transmit antennas;
a receive switch that selectively couples the receiver to one of the array of receive antennas; wherein
the array of transmit antennas is arranged in one or more rows;
the array of receive antennas is arranged in one or more rows, each row being approximately parallel to, adjacent to and offset from one of the rows of transmit antennas, so that each receive antenna in a row except one is adjacent to two transmit antennas, and each transmit antenna in a row except one is adjacent to two receive antennas; and
the transmit switch and the receive switch couple the transmitter and receiver, respectively, to a first transmit antenna and a first adjacent receive antenna, and subsequently to the first transmit antenna and a second adjacent receive antenna.

24. A method for collecting and displaying data from a ground penetrating radar system, the ground penetrating radar system comprising a plurality of transmit antennas and a plurality of receive antennas, each transmit antenna, except one, having two adjacent receive antennas, the system being mounted on a cart that moves over ground, the method comprising
collecting raw data, comprising
a. selecting a first of the plurality of transmit antennas for transmitting a signal into the ground, wherein a portion of the signal is reflected back from the ground;
b. selecting a first receive antenna that is adjacent to the selected transmit antenna;
c. collecting raw data from the portion of the reflected signal received by the selected receive antenna, the raw data being collected at spatial location $(x_m, y_n)$, the spatial location $(x_m, y_n)$ being denoted by $\Psi_{mnp}$ where the indices m, n are used to denote position in a grid of spatial locations where the raw data was collected, and p is an index ranging from 1 to P corresponding to a frequency $f_p$ at which the raw data was collected;
d. repeating step c for both receive antennas adjacent to the selected transmit antenna;
e. repeating steps b, c and d for all transmit antennas;
f. repeating steps a, b, c, d, and e each time the cart moves to a new location;
preconditioning the raw data to produce preconditioned data;
analyzing the preconditioned data; and
displaying images of the analyzed data.

25. The method of claim 24 wherein preconditioning the raw data to produce preconditioned data comprises g. removing a constant frequency component and a system travel time delay;
h. removing a transmit-antenna to receive-antenna coupling effect;
i. prewhitening; and
j. repeating steps g, h and i for each spatial location of the raw data.

26. The method of claim 25 wherein removing a constant frequency component and a system travel time delay comprises applying the following equation:

$$\hat{\Psi}_{mnp} = \left(\Psi_{mnp} - \frac{1}{P}\sum_{p=1}^{P}\Psi_{mnp}\right)\exp(i \cdot 2\pi \cdot f_p \cdot \tau).$$

27. The method of claim 25 wherein removing the transmit-antenna to receive-antenna coupling effect comprises applying the following equation:

$$\Psi_{mnp} = \hat{\Psi}_{mnp} - \hat{\Psi}_{m\bar{n}p}$$

where $\hat{\Psi}_{m\bar{n}p}$ is an in track reference scan.

28. The method of claim 25 wherein removing the transmit-antenna to receive-antenna coupling effect comprises applying the following equation:

$$\Psi_{mnp} = \hat{\Psi}_{mnp} - \frac{1}{N_2 - N_1 + 1} \cdot \sum_{n=N_1}^{N_2} \hat{\Psi}_{mnp}$$

where $N_1$ and $N_2$ define a region to be imaged.

29. The method of claim 25 wherein removing the transmit-antenna to receive-antenna coupling effect comprises applying the following equation:

$$\Psi_{mnp} = \sum_{q=-Q}^{Q} a_q \cdot \hat{\Psi}_{m,n+q,p}$$

where $a_q$ are digital filter coefficients chosen to reject low frequency spatial energy.

30. The method of claim 25 wherein removing the transmit-antenna to receive-antenna coupling effect comprises applying the following equation:

$$\Psi_{mnp} = \hat{\Psi}_{mnp} - \hat{\Psi}_{\bar{m}np}$$

where $\hat{\Psi}_{\bar{m}np}$ is a crossline reference scan.

31. The method of claim 25 wherein prewhitening comprises applying the following equation:

$$\gamma_{mnp} = b_p \cdot \Psi_{mnp}$$

where $b_p$ are frequency dependent weights.

32. The method of claim 24 wherein analyzing the preconditioned data comprises applying the following equation:

$$I_{mnp} = \frac{1}{(2U+1)(2V+1)P} \cdot \sum_{u=-U}^{U}\sum_{v=-V}^{V}\sum_{p=P_1}^{P_2} \gamma_{m+u,n+v,p}\exp(i \cdot 2\pi \cdot f_p \cdot \tau_{uvw})$$

where $I_{mnw}$ is the complex image value at spatial location $(x_{F,m}, y_{F,n}, z_w)$;
U is the SAR array size in the cross-track direction;
V is SAR array size in the along track direction;
$(f_{P_1}, f_{P_2})$ is the frequency processing band;
$\tau_{uvw}$ is the travel time from source (u, v) in the SAR array down to a focal point at depth $z_w$ and back up to receiver (u, v) in the SAR array;

$$x_{F,m} = \frac{3d}{4} + \frac{(m-1)d}{4};$$

$y_{F,n}$=0.933013d+(n−1)dy;
d=5.52 inches; and
dy=scan spacing.

33. The method of claim 32 wherein the transmit antennas and the receive antennas are in contact with the ground and wherein $$\tau_{uvw} = \frac{1}{c_g}[(x_{s,u} - x_{r,u})^2 + (y_{s,v} - y_{r,v})^2 + z_w^2]$$

where $(x_{s,u}, y_{s,v})$ and $(x_{r,u}, y_{r,v})$ are the location of the transmit and receive antennas and $c_g$ is the speed of light in the ground.

34. The method of claim 24 wherein displaying images of the analyzed data computing a plan view image of the analyzed data;
computing a side view image of the analyzed data; and
displaying the plan view image and the side view image.

35. The method of claim 34 wherein computing a plan view image of the analyzed data comprises applying the following equation:

$$\text{PlanView}_{mn} = \max_w |I_{mnw}|^2$$

where $\max_w$ is the maximum value across all w, depths.

36. The method of claim 34 wherein computing a side view image of the analyzed data comprises applying the following equation:

$$\text{SideView}_{nw} = \max_m |I_{mnw}|^2$$

where $\max_w$ is the maximum value across all w, depths.

* * * * *